United States Patent
Ikegami et al.

(10) Patent No.: US 8,983,702 B2
(45) Date of Patent: Mar. 17, 2015

(54) CONTROL UNIT FOR VEHICLE DRIVING SYSTEM

(75) Inventors: Takefumi Ikegami, Wako (JP); Iori Kanamori, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 13/985,113

(22) PCT Filed: Nov. 4, 2011

(86) PCT No.: PCT/JP2011/075457
§ 371 (c)(1),
(2), (4) Date: Aug. 13, 2013

(87) PCT Pub. No.: WO2012/111197
PCT Pub. Date: Aug. 23, 2012

(65) Prior Publication Data
US 2013/0325237 A1 Dec. 5, 2013

(30) Foreign Application Priority Data

Feb. 18, 2011 (JP) ................................ 2011-032913

(51) Int. Cl.
*B60L 11/00* (2006.01)
*B60W 10/00* (2006.01)
(Continued)

(52) U.S. Cl.
CPC .............. *B60W 20/106* (2013.01); *B60L 11/14* (2013.01); *B60L 11/1861* (2013.01); *B60K 6/48* (2013.01); *B60W 10/06* (2013.01); *B60W 10/08* (2013.01); *B60W 10/113* (2013.01); *B60W 10/30* (2013.01); *B60L 1/003* (2013.01); *B60L 7/12* (2013.01); *B60W 10/11* (2013.01); *Y02T 10/7077* (2013.01); *F16H 61/0213* (2013.01); *B60K 2006/4816* (2013.01); *Y02T 10/7044* (2013.01); *Y02T 10/7005* (2013.01); *Y02T 10/705* (2013.01); *Y02T 10/6221* (2013.01); *Y02T 10/6256* (2013.01); *B60K 6/547* (2013.01); *B60W 2510/244* (2013.01);
(Continued)

(58) Field of Classification Search
USPC .................... 701/22, 36; 180/65.265, 65.275, 180/68.1–68.2; 454/69–72; 62/132–134, 62/323.1–323.4
See application file for complete search history.

(56) References Cited

U.S. PATENT DOCUMENTS 8,210,828 B2 * 7/2012 Gibson et al. ................. 417/223
2007/0000703 A1 * 1/2007 Hughes et al. ............... 180/65.4

FOREIGN PATENT DOCUMENTS

JP  2000-50412 A  2/2000
JP  2002-89594 A  3/2002
(Continued)

OTHER PUBLICATIONS

International Search Report dated Jan. 24, 2012, issued in corresponding application No. PCT/JP2011/075457.

*Primary Examiner* — Yonel Beaulieu
(74) *Attorney, Agent, or Firm* — Westerman, Hattori, Daniels & Adrian, LLP

(57) ABSTRACT

A control unit 2 includes a standard control map Map1 in which an EV driving permitting region is set according to the SOC of a battery 3 and a substitute control map Map2 in which the EV driving permitting region of the standard control map Map1 is narrowed, whereby when an air conditioning compressor 112A, 112B is actuated to operate, the driving is controlled by selecting the substitute control map Map2 to be referred to in place of the standard control map Map1.

13 Claims, 16 Drawing Sheets

(51) Int. Cl.

| | | |
|---|---|---|
| *B60W 20/00* | (2006.01) | |
| *B60L 11/14* | (2006.01) | |
| *B60L 11/18* | (2006.01) | |
| *B60K 6/48* | (2007.10) | |
| *B60W 10/06* | (2006.01) | |
| *B60W 10/08* | (2006.01) | |
| *B60W 10/113* | (2012.01) | |
| *B60W 10/30* | (2006.01) | |
| *B60L 1/00* | (2006.01) | |
| *B60L 7/12* | (2006.01) | |
| *B60W 10/11* | (2012.01) | |
| *F16H 61/02* | (2006.01) | |
| *B60K 6/547* | (2007.10) | |

(52) U.S. Cl.
CPC ........ *B60W 2510/30* (2013.01); *B60L 2240/34* (2013.01); *B60L 2240/421* (2013.01); *B60L 2240/423* (2013.01); *B60L 2240/425* (2013.01); *B60L 2240/441* (2013.01); *B60L 2240/486* (2013.01); *Y02T 10/6286* (2013.01); *Y02T 10/642* (2013.01); *B60W 2600/00* (2013.01); *Y10S 903/93* (2013.01)
USPC .................. 701/22; 180/65.265; 903/930

(56) References Cited

FOREIGN PATENT DOCUMENTS

| JP | 2009-67162 A | 4/2009 |
|---|---|---|
| JP | 2010-221853 A | 10/2010 |
| JP | 2011-025838 A | 2/2011 |

\* cited by examiner

<THIRD-SPEED EV DRIVING>

CONTROL UNIT FOR VEHICLE DRIVING SYSTEM

TECHNICAL FIELD

The present invention relates to a control unit for a vehicle driving system including an air conditioner compressor.

BACKGROUND ART

There is known a vehicle driving system which include an internal combustion engine, an electric motor and a compressor for an air conditioner which controls the humidity, ventilation, and temperature in a passenger compartment of a vehicle (for example, refer to Patent Literature 1).

As shown in FIG. 16, a vehicle driving system 200 of Patent Literature 1 has a twin-clutch type transmission mechanism which includes a first input shaft 202a that is connected to an electric motor 210 and which is selectively coupled with an internal combustion engine output shaft 204 by a first engaging and disengaging unit 205, a second input shaft 202b which is selectively coupled with the internal combustion engine output shaft 204 by a second engaging and disengaging unit 206, an output shaft 203 which outputs a driving force to a driven portion, a first gearset including plural gears that are disposed on the first input shaft 202a and which are selectively coupled with the first input shaft 202a via first synchronizers 230, 231, a second gearset including plural gears that are disposed on the second input shaft 202b and which are selectively coupled with the second input shaft 202b via second synchronizers 216, 217, and a third gearset including plural gears that are disposed on the output shaft 203 and which mesh with the gears of the first gearset and the gears of the second gearset. An air conditioning compressor 260, which is an auxiliary device, is coupled with the electric motor 210 via an air conditioning clutch 261.

RELATED ART LITERATURE

Patent Literature

Patent Literature 1
JP-2002-089594-A

SUMMARY OF THE INVENTION

Problem that the Invention is to Solve

In this type of vehicle driving system, although fuel economy is improved by performing an EV driving using the electric motor in an area where the efficiency of the internal combustion engine is deteriorated, there still remains a problem of how to control the operation of the air conditioning compressor which consumes relatively much electric power and the SOC of a battery. There is also a problem that the SOC of the battery is reduced as a result of the operation of the air conditioning compressor to thereby cause the frequent occurrence of the shifting in driving mode between the EV driving and an internal combustion engine driving. Patent Literature 1 describes nothing about how to control the operation of the air conditioning compressor and the SOC of the battery.

The invention has been made in view of the above-described situations. A first object of the invention is to provide a control unit for a vehicle driving system which can control the SOC so as not to shift to a minimum region even when the air conditioning compressor is actuated. A second object of the invention is to provide a control unit for a vehicle driving system which can suppress the frequent occurrence of the shifting in driving mode between the EV driving and an internal combustion engine driving so as to suppress the consumption of electric power associated with the starting of the internal combustion engine.

Means for Solving the Problem

With a view to attaining the first object, a first aspect of the present disclosure defines
a control unit (e.g., a control unit 2 in embodiment) for a vehicle driving system (e.g., vehicle driving systems 1, 1A, 1B, 1c in embodiment),
the vehicle driving system including:
an internal combustion engine (e.g., an engine 6 in embodiment);
an electric motor (e.g., an electric motor 7 in embodiment);
a battery device (e.g., a battery 3 in embodiment) which supplies electric power to the electric motor;
a transmission mechanism (e.g., transmissions 20, 20A in embodiment) including
a first input shaft (e.g., a first main shaft 11 in embodiment) which is connected to the electric motor and which is selectively connected to the internal combustion engine via a first engaging and disengaging unit (e.g., a first clutch 41 in embodiment),
a second input shaft (e.g., a second intermediate shaft 16 in embodiment) which is selectively connected to the internal combustion engine via a second engaging and disengaging unit (e.g., a second clutch 42 in embodiment), and
an output shaft (e.g., a counter shaft 14 in embodiment) which is selectively coupled with the first input shaft via a first gear selection device (e.g., a lock mechanism 61, a first odd-numbered gear selection shifter 51A, a second odd-numbered gear selection shifter 51B, an odd-numbered gear selection shifter 51 in embodiment) and which is selectively coupled with the second input shaft via a second gear selection device (e.g., a first even-numbered gear selection shifter 52A, a second even-numbered gear selection shifter 52B, an even-numbered gear selection shifter 52 in embodiment); and
an air conditioning compressor (e.g., air conditioning compressors 112A, 112B in embodiment),
the control unit including:
a first map (e.g., a standard control map Map1 in embodiment) in which an EV driving permitting region is set according to an SOC of the battery device and a second map (e.g., a substitute control map Map2 in embodiment) in which the EV driving permitting region of the first map is narrowed,
wherein a driving control is performed by selecting the second map to be referred to in place of the first map when the air conditioning compressor is actuated.

With a view to attaining the second object, a second aspect of the present disclosure defines
a control unit (e.g., the control unit 2 in embodiment) for a vehicle driving system (e.g., the vehicle driving systems 1, 1A, 1B, 1c in embodiment),
the vehicle driving system including:
an internal combustion engine (e.g., the engine 6 in embodiment);
an electric motor (e.g., the electric motor 7 in embodiment);
a battery device (e.g., the battery 3 in embodiment) which supplies electric power to the electric motor;

a transmission mechanism (e.g., the transmissions 20, 20A in embodiment) including
- a first input shaft (e.g., the first main shaft 11 in embodiment) which is connected to the electric motor and which is selectively connected to the internal combustion engine via a first engaging and disengaging unit (e.g., the first clutch 41 in embodiment),
- a second input shaft (e.g., the second intermediate shaft 16 in embodiment) which is selectively connected to the internal combustion engine via a second engaging and disengaging unit (e.g., the second clutch 42 in embodiment), and
- an output shaft (e.g., the counter shaft 14 in embodiment) which is selectively coupled with the first input shaft via a first gear selection device (e.g., the lock mechanism 61, the first odd-numbered gear selection shifter 51A, the second odd-numbered gear selection shifter 51B, then odd-numbered gear selection shifter 51 in embodiment) and which is selectively coupled with the second input shaft via a second gear selection device (e.g., the first even-numbered gear selection shifter 52A, the second even-numbered gear selection shifter 52B, then even-numbered gear selection shifter 52 in embodiment); and an air conditioning compressor (e.g., the air conditioning compressors 112A, 112B in embodiment);

the control unit including:

a first map (e.g., a standard control map Map1 in embodiment) in which an EV driving permitting region is set according to an SOC of the battery device and a second map (e.g., a substitute control map Map2 in embodiment) in which the EV driving permitting region of the first map is narrowed, wherein a driving control is performed by selecting the second map to be referred to in place of the first map when an EV driving is shifted to an internal combustion engine driving as a result of the SOC entering from the EV driving permitting region to an EV driving prohibiting region while the air conditioning compressor is in operation, and wherein the driving control is performed by selecting the first map to be referred to in place of the second map when the internal combustion engine driving is shifted to the EV driving as a result of the SOC entering again the EV driving permitting region from the EV driving prohibiting region.

A third aspect of the present disclosure defines the control unit, wherein, when the battery device starts to deteriorate, a falling rate of a threshold of a lower limit zone where the internal combustion engine can still be started by the electric motor is set to be smaller than those of thresholds of other zones to thereby ensure the lower limit zone so that the internal combustion engine can be started by the electric motor.

A fourth aspect of the present disclosure defines the control unit, wherein, when the EV driving is shifted to the internal combustion engine driving, a gear selection map is changed to a charge preference mode.

A fifth aspect of the present disclosure defines the control unit, wherein, the air conditioning compressor is an electric air conditioning compressor which is driven by being supplied with electric power from the battery device.

A sixth aspect of the present disclosure defines the control unit, wherein the air conditioning compressor is coupled to the first input shaft via an air conditioning clutch (e.g., an air conditioning clutch 121 in embodiment).

A seventh aspect of the present disclosure defines the control unit, wherein, when a cooling performance of the air conditioning compressor is higher than a required cooling performance and an off state period in a PWM control is equal to or larger than a predetermined number of times while the driving control is being performed based on the second map, the first map is selected back from the second map.

An eighth aspect of the present disclosure defines the control unit, wherein, when the cooling performance of the air conditioning compressor is lower a predetermined deviation or more than the required cooling performance, a gear shift is performed to increase a rotation speed of the first input shaft so as to satisfy the required cooling performance or the first gear selection device is shifted without changing the gear engaged with which the vehicle is driven.

According to the control unit of the first aspect of the present disclosure, since the driving control is performed with the narrowed EV driving permitting region when the air conditioning compressor is operating, the EV driving prohibiting region is expanded when the air conditioning compressor which constitutes a relatively large load is operating so as to start the internal combustion engine earlier, whereby the SOC is made difficult to shift to the lowest region, thereby providing a margin in controlling the SOC.

According to the control unit of the second aspect of the present disclosure, when the EV driving is shifted to the internal combustion engine driving as a result of the SOC entering from the EV driving permitting region to the EV driving prohibiting region while the air conditioning compressor is operating, the driving control is performed with the EV driving prohibiting region expanded, and the driving control is performed by selecting back the original maps when the internal combustion engine driving is shifted to the EV driving as a result of the SOC entering again the EV driving permitting region from the EV driving prohibiting. Therefore, when the driving mode is shifted to the EV driving again, the EV driving permitting region can be ensured. This can suppress the consumption of electric power associated with restarting the engine which results from frequent switching between the EV driving and the internal combustion engine driving.

According to the control unit of the third aspect of the present disclosure, by ensuring the lower limit zone where the internal combustion engine can be started by the electric motor even for the deteriorated battery device, even when the SOC of the battery device decreases, the internal combustion engine can be started by the electric motor in an ensured fashion.

According to the control unit of the fourth aspect of the present disclosure, when the EV driving is shifted to the internal combustion engine driving as a result of the SOC decreasing, by changing the gear selection map to the charge preference mode, the SOC can be recovered quickly.

According to the control unit of the fifth aspect of the present disclosure, by employing the electric air conditioning compressor, the control of the transmission can be simplified.

According to the control unit of the sixth aspect of the present disclosure, since the air conditioning compressor can be driven by the internal combustion engine or the electric motor which is used to drive the vehicle, the general-purpose air conditioning compressor can be used, thereby decreasing the costs.

According to the control unit of the seventh aspect of the present disclosure, when the cooling performance of the air conditioning compressor is higher than the required cooling performance, the first map is switched back from the second map, whereby the improvement in fuel economy associated with the EV driving can be made use of effectively.

According to the control unit of the eighth aspect of the present disclosure, when the cooling performance of the air conditioning compressor is lower the predetermined deviation or more than the required cooling performance, by shifting the gear engaged or performing the preshift, the rotation speed of the first input shaft to which the air conditioning compressor is coupled is increased, whereby the cooling performance of the air conditioning compressor can be increased.

BRIEF DESCRIPTION OF THE DRAWINGS

FIG. 7A is an alignment chart, and FIG. 7B is a diagram showing a torque transmitting condition of the vehicle driving system.

MODE FOR CARRYING OUT THE INVENTION

Figure 1:
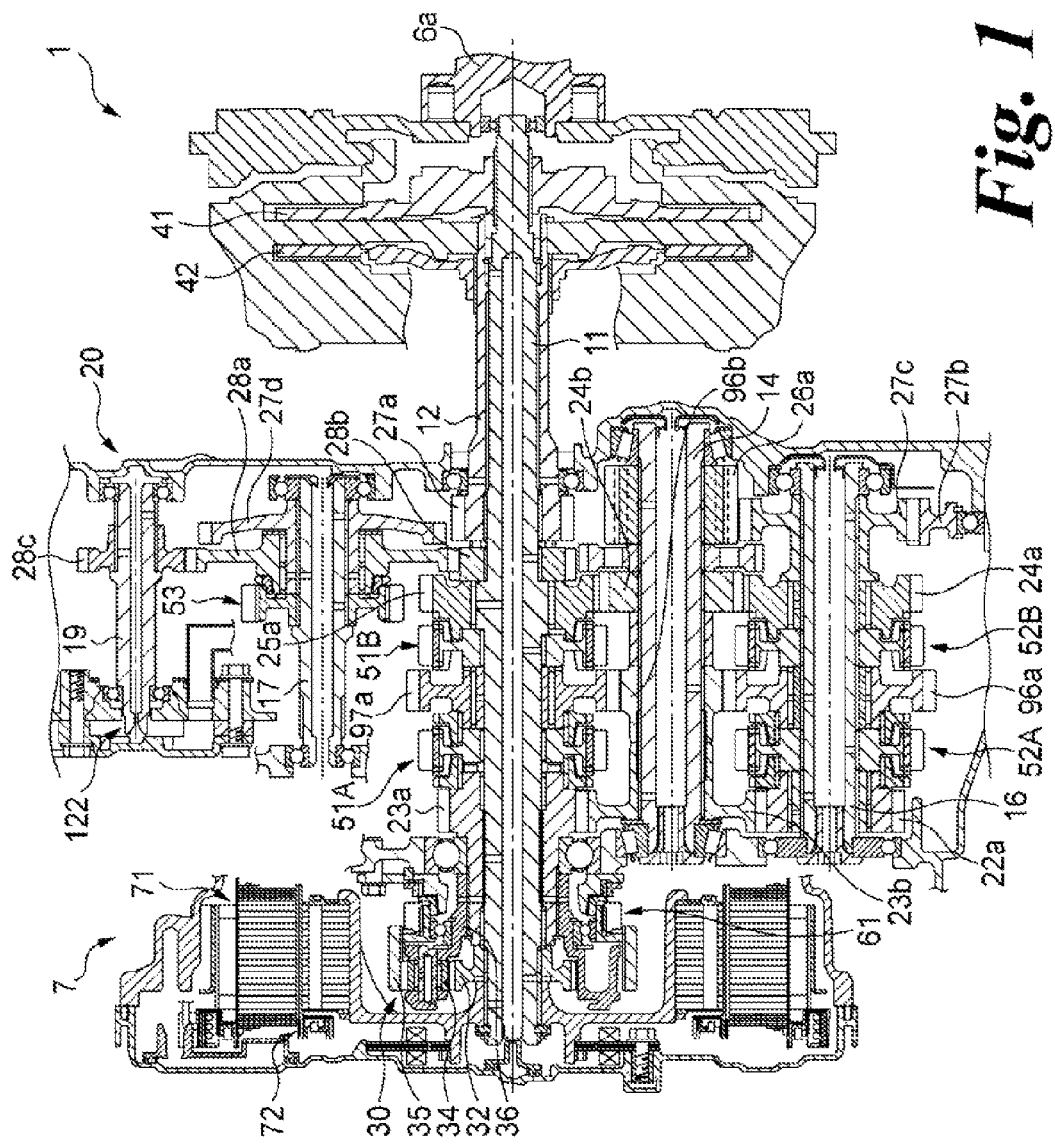
FIG. 1 is a sectional view showing an example of a vehicle driving system to which a control unit of the invention can be applied.
Figure 2:
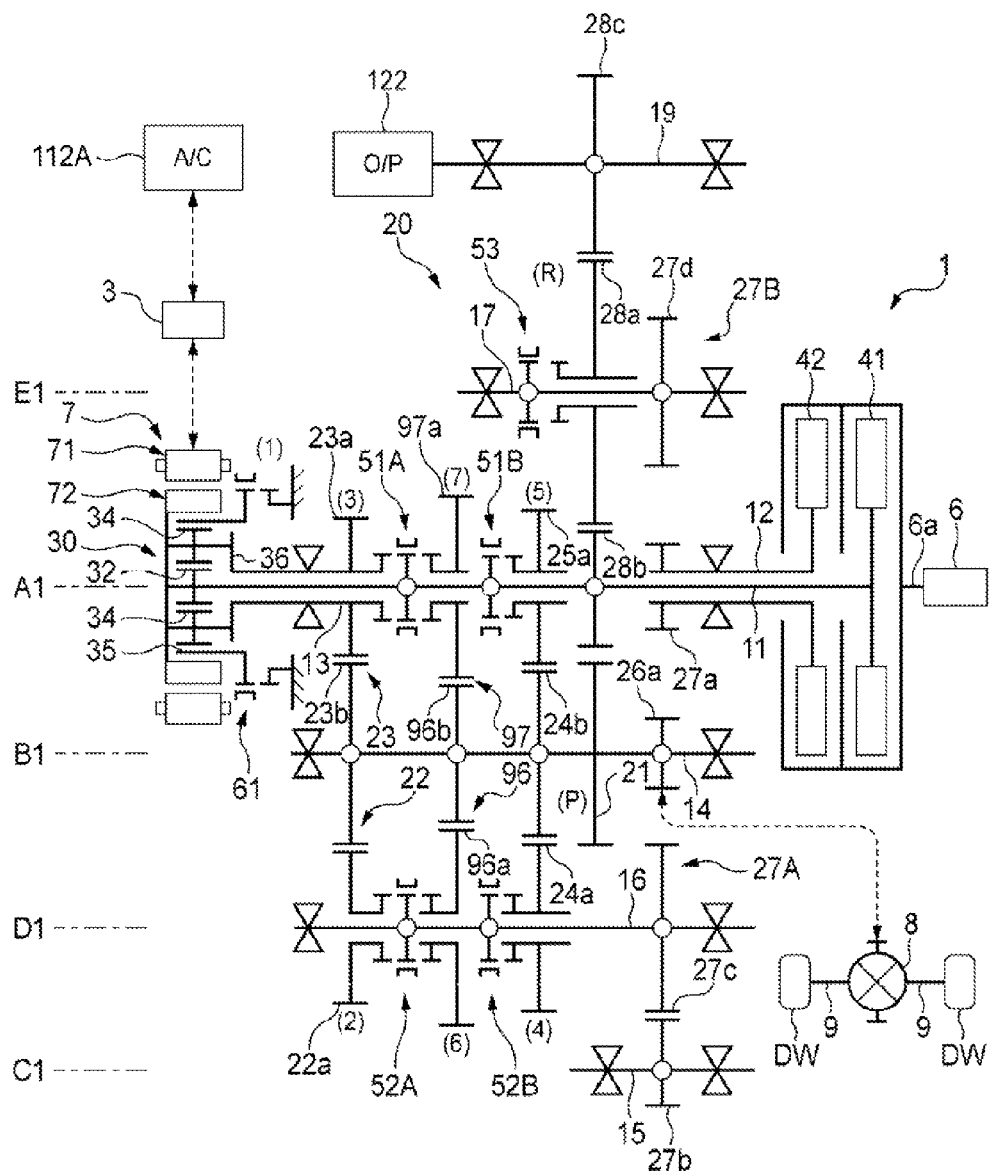
FIG. 2 is a schematic block diagram of the vehicle driving system shown in FIG. 1.

Hereinafter, one example of a vehicle driving system to which a control unit of the invention can be applied will be described by reference to FIGS. 1 and 2.

A vehicle driving system 1 is intended to drive driving wheels DW, DW via drive shafts 9, 9 of a hybrid vehicle (not shown) and includes an internal combustion engine (engine) 6 which is a drive source, an electric motor 7, and a transmission 20 which transmits a driving force to the driving wheels DW, DW.

The engine 6 is, for example, a gasoline engine or a diesel engine, and a first clutch 41 and a second clutch 42 of the transmission 20 are connected to a crankshaft 6a of this engine 6.

The electric motor 7 is a three-phase brushless DC motor, has a stator 71 and a rotor 72 which is disposed so as to face oppositely this stator 71, and is disposed on an outer circumferential side of a ring gear 35 of a planetary gear mechanism 30, which will be described later. The rotor 72 is coupled to a sun gear 32 of the planetary gear mechanism 30 and is designed to rotate together with the sun gear 32 of the planetary gear mechanism 30.

The planetary gear mechanism 30 has the sun gear 32, the ring gear 35 that is disposed concentrically with the sun gear 32 and which is disposed so as to surround the circumference of the sun gear 32, planetary gears 34 which mesh with the sun gear 32 and the ring gear 35, and a carrier 36 which supports the planetary gears 34 so as not only to spin or rotate on its axis but also to walk or revolve. The sung gear 32 and the ring gear 35 and the carrier 36 are designed to rotate relatively in a differential fashion.

A lock mechanism 61 is provided on the ring gear 35, and the lock mechanism 61 has a synchronizer mechanism and is designed so as to stop (lock) the rotation of the ring gear 35. A brake or a frictional engagement device employing a sleeve may be used as the lock mechanism 61.

The transmission 20 is a so-called twin clutch type transmission and includes the first clutch 41, the second clutch 42 and the planetary gear mechanism 30, which have been described before, and plural speed-changing gears.

More specifically, the transmission 20 includes a first main shaft 11 which is disposed coaxially with the crankshaft 6a of the engine 6 (on a rotational axis A1), a second main shaft 12, a connecting shaft 13, a counter shaft 14 which is rotatable about a rotational axis B1 which is parallel to the rotational axis A1, a first intermediate shaft 15 which is rotatable about a rotational axis C1 which is parallel to the rotational axis A1, a second intermediate shaft 16 which is rotatable about a rotational axis D1 which is parallel to the rotational axis A1, and a reverse shaft 17 which is rotatable about a rotational axis E1 which is disposed parallel to the rotational axis A1.

The first clutch 41 is provided on the first main shaft 11 on a side which faces the engine 6, and the sun gear 32 of the planetary gear mechanism 30 and the rotor 72 of the electric motor 7 are provided on the first main shaft 11 on an opposite side to the side which faces the engine 6 so as to rotate together with the first main shaft 11. Consequently, the first main shaft 11 is not only selectively coupled with the crankshaft 6a of the engine 6 by the first clutch 41, but also is directly coupled with the electric motor 7, so that the driving force of the engine 6 and/or the electric motor 7 is designed to be inputted into the planetary gear mechanism 30.

The second main shaft 12 is formed shorter than the first main shaft 11 and hollow and is disposed so as to cover the circumference of the first main shaft 11 on the side which faces the engine 6 while allowed to rotate relative to the first main shaft 11. The second clutch 42 is provided on the second main shaft 12 on a side which faces the engine 6, and an idler drive gear 27a is provided on the second main shaft 12 on an opposite side to the side which faces the engine 6 so as to rotate together with the second main shaft 12. Consequently, the second main shaft 12 is selectively coupled with the crankshaft 6a of the engine 6 by the second clutch 42, so that the driving force of the engine 6 is inputted into the idler drive gear 27a.

The connecting shaft 13 is formed shorter than the first main shaft 11 and hollow and is disposed so as to cover the circumference of the opposite side of the first main shaft 11 to the side which faces the engine 6 while allowed to rotate relatively to the first main shaft 11. A third-speed drive gear 23a is provided on the connecting shaft 13 on a side which faces the engine 6 so as to rotate together with the connecting shaft 13. The carrier 36 of the planetary gear mechanism 30 is provided on the connecting shaft 13 on an opposite side to the side which faces the engine 6 so as to rotate together with the connecting shaft 13. Consequently, the carrier 36 and the third-speed drive gear 23a, which are provided on the connecting shaft 13, are designed to rotate together as the planetary gears 34 walk or revolve.

A seventh-speed drive gear 97a and a fifth-speed drive gear 25a, which make up an odd-numbered gear changing section together with the third-speed drive gear 23a, are provided in that order as seen from the third-speed drive gear 23a side on the first main shaft 11 between the third-speed drive gear 23a provided on the connecting shaft 13 and the idler drive gear 27a provided on the second main shaft 12 so as to rotate relative to the first main shaft 11. A reverse driven gear 28b is provided between the fifth-speed drive gear 25a and the idler drive gear 27a so as to rotate together with the first main shaft 11.

A first odd-numbered gear selection shifter 51A, which couples the first main shaft 11 with the third-speed drive gear 23a or the seventh-speed drive gear 97a or releases the coupling therebetween, is provided between the third-speed drive gear 23a and the seventh-speed drive gear 97a. A second odd-numbered gear selection shifter 51B, which couples the first main shaft 11 with the fifth-speed drive gear 25a or releases the coupling therebetween, is provided between the seventh-speed drive gear 97a and the fifth-speed drive gear 25a.

Then, when the first odd-numbered gear selection shifter 51A is engaged in a third speed engaging position, the first main shaft 11 and the third-speed drive gear 23a are coupled with each other so as to rotate together. When the first odd-numbered gear selection shifter 51A is engaged in a seventh speed engaging position, the first main shaft 11 and the seventh-speed drive gear 97a are coupled with each other so as to rotate together. When the first odd-numbered gear selection shifter 51A is in a neutral position, the first main shaft 11 rotate relative to the third-speed drive gear 23a and the seventh-speed drive gear 97a. When the first main shaft 11 and the third-speed drive gear 23a rotate together, the sun gear 32 provided on the first main shaft 11 and the carrier 36 which is coupled with the third-speed drive gear 23a by the connecting shaft 13 rotate together, and the ring gear 35 also rotates together, whereby the planetary gear mechanism 30 becomes integral.

When the second odd-numbered gear selection shifter 51B is engaged, the first main shaft 11 and the fifth-speed drive gear 25a are coupled with each other so as to rotate together, and when the second odd-numbered gear selection shifter 51B is in a neutral position, the first main shaft 11 rotates relative to the fifth-speed drive gear 25a.

A first idler driven gear 27b, which meshes with the idler drive gear 27a which is provided on the second main shaft 12, is provided on the first intermediate shaft 15 so as to rotate together with the first intermediate shaft 15.

A second idler driven gear 27c, which meshes with the first idler driven gear 27b which is provided on the first intermediate shaft 15 is provided on the second intermediate shaft 16 so as to rotate together with the second intermediate shaft 16. The second idler driven gear 27c makes up a first idler gear train 27A together with the idler drive gear 27a and the first idler driven gear 27b, which are described before, whereby the driving force of the engine 6 is transmitted from the second main shaft 12 to the second intermediate shaft 16 by way of the first idler gear train 27A.

A second-speed drive gear 22a, a sixth-speed drive gear 96a and a fourth-speed drive gear 24a, which make up an even-numbered gear changing section, are provided on the second intermediate shaft 16 in positions corresponding respectively to the third-speed drive gear 23a, the seventh-speed drive gear 97a and the fifth-speed drive gear 25a, which are provided on the first main shaft 11, so as to rotate relative to the second intermediate shaft 16.

A first even-numbered gear selection shifter 52A, which couples the second intermediate shaft 16 with the second-speed drive gear 22a or the sixth-speed drive gear 96a or releases the coupling therebetween, is provided between the second-speed drive gear 22a and the sixth-speed drive gear 96a, and a second even-numbered gear selection shifter 52B, which couples the second intermediate shaft 16 with the fourth-speed drive gear 24a or releases the coupling therebetween, is provided between the sixth-speed drive gear 96a and the fourth-speed drive gear 24a.

Then, when the first even-numbered gear selection shifter 52A is engaged in a second speed engaging position, the second intermediate shaft 16 and the second-speed drive gear 22a are coupled with each other so as to rotate together. When the first even-numbered gear selection shifter 52A is engaged in a sixth speed engaging position, the second intermediate shaft 16 and the sixth-speed drive gear 96a are coupled with each other so as to rotate together. When the first even-numbered gear selection shifter 52A is in a neutral position, the second intermediate shaft 16 rotates relative to the second-speed drive gear 22a and the sixth-speed drive gear 96a.

When the second even-numbered gear selection shifter 52B is engaged, the second intermediate shaft 16 and the fourth-speed drive gear 24a are coupled with each other so as to rotate together, and when the second even-numbered gear selection shifter 52B is in a neutral position, the second intermediate shaft 16 rotates relative to the fourth-speed drive gear 24a.

A first common driven gear 23b, a second common driven gear 96b, a third common driven gear 24b, a park gear 21, and a final gear 26a are provided on the counter shaft 14 in that order as seen from the engine 6 side so as to rotate together.

The first common driven gear 23b meshes with the third-speed drive gear 23a which is provided on the connecting shaft 13 so as to make up a third-speed gear 23 together with the third-speed drive gear 23a and meshes with the second-speed drive gear 22a which is provided on the second intermediate shaft 16 so as to make up a second-speed gear 22 together with the second-speed drive gear 22a.

The second common driven gear 96b meshes with the seventh-speed drive gear 97a which is provided on the first main shaft 11 so as to make up a seventh-speed gear 97 together with the seventh-speed drive gear 97a and meshes with the sixth-speed drive gear 96a which is provided on the second intermediate shaft 16 so as to make up a sixth-speed gear 96 together with the sixth-speed drive gear 96a.

The third common driven gear 24b meshes with the fifth-speed drive gear 25a which is provided on the first main shaft 11 so as to make up a fifth-speed gear 25 together with the fifth-speed drive gear 25a and meshes with the fourth-speed drive gear 24a which is provided on the second intermediate shaft 16 so as to make up a fourth-speed gear 24 together with the fourth-speed gear 24a.

The final gear 26a meshes with a differential gear mechanism 8, and the differential gear mechanism 8 is coupled to the driving wheels DW, DW by way of the drive shafts 9, 9. Consequently, the driving force transmitted to the counter shaft 14 is outputted from the final gear 26a to the differential gear mechanism 8, the drive shafts 9, 9 and the driving wheels DW, DW.

A third idler driven gear 27d, which meshes with the first idler driven gear 27b provided on the first intermediate shaft 15, is provided on the reverse shaft 17 so as to rotate together with the reverse shaft 17. The third idler driven gear 27d makes up a second idler gear train 27B together with the idler drive gear 27a and the first idler driven gear 27b, which are described before, whereby the driving force of the engine 6 is transmitted from the second main shaft 12 to the reverse shaft 17 by way of the second idler gear train 27B. A reverse drive gear 28a, which meshes with the reverse driven gear 28b which is provided on the first main shaft 11, is provided on the reverse shaft 17 so as to rotate relative to the reverse shaft 17. The reverse drive gear 28a makes up a reverse gear train 28 together with the reverse driven gear 28b. A reverse shifter 53 is provided on the reverse shaft 17 at a side of the reverse drive gear 28a which is opposite to a side which faces the engine 6, and the reverse shaft 53 couples the reverse shaft 17 with the reverse drive gear 28a or releases the coupling therebetween.

Then, when the reverse shifter 53 is engaged in a reverse engaging position, the reverse shaft 17 and the reverse drive gear 28a rotate together, and when the reverse shifter 53 is in a neutral position, the reverse shaft 17 and the reverse drive gear 28a rotate relative to each other.

The first and second odd-numbered gear selection shifters 51A, 51B, the first and second even-numbered gear selection shifters 52A, 52B and the reverse shifter 53 employ a clutch mechanism having a synchronizing function to make the rotation speeds of the shaft and the gear which are connected together coincide with each other. The first and second odd-numbered gear selection shifters 51A, 51B make up an odd-numbered gear selection unit together with the lock mechanism 61, and the first and second even-numbered gear selection shifters 52A, 52B make up an even-numbered gear selection unit.

In the transmission 20 configured in this way, the odd-numbered gear changing section made up of the third-speed drive gear 23a, the seventh-speed drive gear 97a and the fifth-speed drive gear 25a is formed on the first main shaft 11, which is one of two gear changing shafts of the transmission 20, and the even-numbered gear changing section made up of the second-speed drive gear 22a, the sixth-speed drive gear 96a and the fourth-speed drive gear 24a is formed on the second intermediate shaft 16, which is the other of the two gear changing shafts.

An electric air conditioning compressor 112A which incorporates a motor which is different from the electric motor 7 and an oil pump 122 are provided in the vehicle driving system 1. The oil pump 122 is mounted on an oil pump auxiliary shaft 19 which is disposed parallel to the rotational axes A1 to E1 so as to rotate together with the oil pump auxiliary shaft 19. An oil pump driven gear 28c, which meshes with the reverse drive gear 28a, is mounted on the oil pump auxiliary shaft 19 so as to rotate together with the oil pump auxiliary shaft 19, whereby the driving force of the engine 6 and/or the electric motor 7 which rotates the first main shaft 11 is transmitted to the oil pump 122.

The vehicle driving system 1 of this embodiment has the following first to fifth transmission paths.

(1) Along a first transmission path, the driving force of the engine 6 is transmitted to the driving wheels DW, DW by way of the first main shaft 11, the planetary gear mechanism 30, the connecting shaft 13, the third-speed gear 23 (the third-speed drive gear 23a, the first common driven gear 23b), the counter shaft 14, the final gear 26a, the differential gear mechanism 8, and the drive shafts 9, 9. A gear ratio of the planetary gear mechanism 30 is set so that an engine torque that is transmitted to the driving wheels DW, DW by way of the first transmission path corresponds to a first speed torque. Namely, the engine torque is set so that a gear ratio resulting from multiplying the gear ratio of the planetary gear mechanism 30 by the gear ratio of the third-speed gear 23 corresponds to a first speed gear ratio. By applying the first clutch 41, locking the lock mechanism 61 and engaging the first and second odd-numbered gear selection shifters 51A, 51B in their neutral positions, a first-speed driving is performed by way of the first transmission path.

(2) Along a second transmission path, the driving force of the engine 6 is transmitted to the driving wheels DW, DW by way of the second main shaft 12, the first idler gear train 27A (the idler drive gear 27a, the first idler driven gear 27b, the second idler driven gear 27c), the second intermediate shaft 16, the second-speed gear 22 (the second-speed drive gear 22a, the first common driven gear 23b) or the fourth-speed gear 24 (the fourth-speed drive gear 24a, the third common driven gear 24b) or the sixth-speed gear 96 (the sixth-speed drive gear 96a, the second common driven gear 96b), the counter shaft 14, the final gear 26a, the differential gear mechanism 8, and the drive shafts 9, 9. A second-speed driving is performed by way of this second transmission path by applying the second clutch 42 and engaging the first even-numbered gear selection shifter 52A in the second speed engaging position, a fourth-speed driving is performed by engaging the second even-numbered gear selection shifter 52B, and a sixth-speed driving is performed by engaging the first even-numbered gear selection shifter 52A in the sixth speed engaging position.

(3) Along a third transmission path, the driving force of the engine 6 is transmitted to the driving wheels DW, DW by way of the first main shaft 11, the third-speed gear 23 (the third-speed drive gear 23a, the first common driven gear 23b) or the fifth-speed gear 25 (the fifth-speed drive gear 25a, the third common driven gear 24b) or the seventh-speed gear 97 (the seventh-speed drive gear 97a, the second common driven gear 96b), the counter shaft 14, the final gear 26a, the differential gear mechanism 8, and the drive shafts 9, 9. A third-speed driving is performed by way of this third transmission path by applying the first clutch 41 and engaging the first odd-numbered gear selection shifter 51A in the third speed engaging position, a fifth-speed driving is performed by engaging the second odd-numbered gear selection shifter 51B, and a seventh-speed driving is performed by engaging the first odd-numbered gear selection shifter 51A in the seventh speed engaging position.

(4) Along a fourth transmission path, the driving force of the electric motor 7 is transmitted to the driving wheels DW, DW by way of the planetary gear mechanism 30 or the third-speed gear 23 (the third-speed drive gear 23a, the first common driven gear 23b) or the fifth-speed gear 25 (the fifth-speed drive gear 25a, the third common driven gear 24b) or the seventh-speed gear 97 (the seventh-speed drive gear 97a, the second common driven gear 96b), the counter shaft 14, the final gear 26a, the differential gear mechanism 8, and the drive shafts 9, 9. A first-speed EV driving is performed by way of this fourth transmission path, with the first and second clutches 41, 42 released, by locking the lock mechanism 61 and engaging the first and second odd-numbered gear selection shifters 51A, 51B in their neutral positions, a third-speed EV driving is performed by unlocking the lock mechanism 61 and engaging the first odd-numbered gear selection shifter 51A in the third speed engaging position, a fifth-speed EV driving is performed by unlocking the lock mechanism 61 and engaging the second odd-numbered gear selection shifter 51B, and a seventh-speed EV driving is performed by unlocking the lock mechanism 61 and engaging the first odd-numbered gear selection shifter 51A in the seventh speed engaging position.

(5) Along a fifth transmission path, the driving force of the engine 6 is transmitted to the driving wheels DW, DW by way of the second main shaft 12, the second idler gear train 27B (the idler drive gear 27a, the first idler driven gear 27b, the third idler driven gear 27d), the reverse shaft 17, the reverse gear train 28 (the reverse drive gear 28a, the reverse driving gear 28b), the planetary gear mechanism 30, the connecting shaft 13, the third-speed gear 23 (the third-speed drive gear 23a, the first common driven gear 23b), the counter shaft 14, the final gear 26a, the differential gear mechanism 8, and the drive shafts 9, 9. A reverse driving is performed by way of this fifth transmission path by applying the second clutch 42, engaging the reverse shifter 53 in the reverse engaging position, and locking the lock mechanism 61.

The motor 7 is connected to the battery 3 by way of the control unit 2 which controls the whole of the vehicle in various ways, so that the supply of electric power from the battery 3 and the recovery of energy to the battery in the form of regenerative energy are performed by way of the control unit 2. Namely, the motor 7 is driven based on electric power supplied form the battery 3 by way of the control unit 2. A regenerative power generation is performed based on the rotation of the driving wheels DW, DW or the driving force of the engine 6 while the vehicle is decelerate, thereby performing the charging of (or the recovery of energy to) the battery 3.

The electric air conditioning compressor 112A is also connected to the battery 3 by way of the control unit 2, whereby the electric air conditioning compressor 112A is supplied with electric power by the battery 3 and is PWM controlled by the control unit 2. An acceleration request, a braking request, an engine rotation speed, a motor rotation speed, a motor temperature, rotation speeds of the first and second main shafts 11, 12, a rotation speed of the counter shaft 14, a vehicle speed, a shift position and SOC (State of Charge) are inputted into the control unit 2. On the other hand, a signal to control the engine 6, a signal to control the motor 7, signals signaling a generating state, a charging state and a discharging state of the battery 3, signals to control the first and second odd-numbered gear selection shifters 51A, 51B, the first and second even-numbered gear selection shifters 52A, 52B, and the reverse shifter 53, and signals to control the application (locking) and release (neutral) of the lock mechanism 61 are outputted from the control unit 2.

Figure 3:
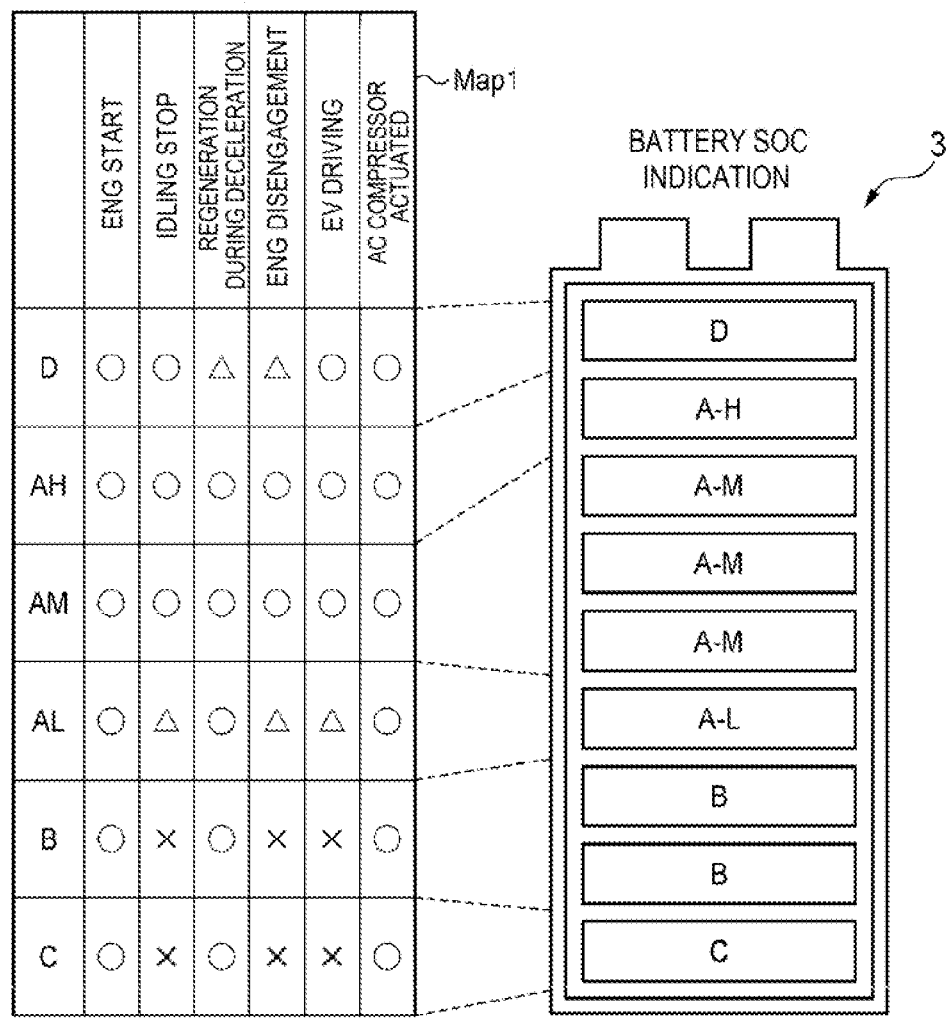
FIG. 3 is an explanatory diagram of a standard control map.
Figure 4:
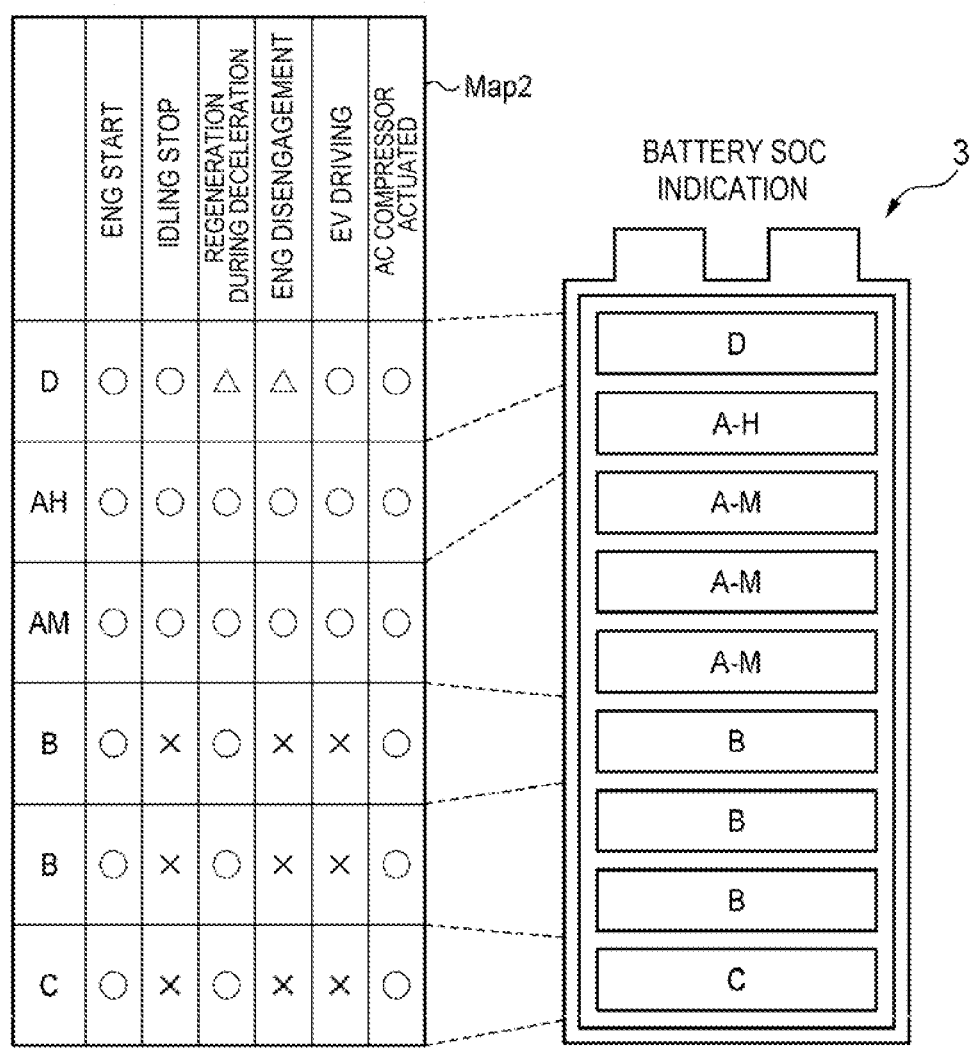
FIG. 4 is an explanatory diagram of a substitute control map.

The control unit 2 has a standard control map Map1 shown in FIG. 3 and a substitute control map Map2 shown in FIG. 4 based on which whether or not various controls can be carried out is determined according to the SOC of the battery 3. Basically, whether or not operations like ENG start, idling stop, regeneration during deceleration, ENG disengagement, EV driving and air conditioning compressor driving can be carried out is determined based on the standard control map Map1. In FIGS. 3 and 4, ◯ denotes that the operations can be carried out, × denotes that the operations are prohibited, and Δ denotes that the operations can be carried out on certain condition.

In the standard control map Map1, the SOC is classified into four zones, that is, a zone C, a zone B, a zone A, and a zone D in the order of increasing SOC, and further, the zone A is classified into three zones, that is, a zone A-L, a zone A-M, and a zone A-H in the order of increasing SOC, thus, the SOC being classified into six zones in total. Then, in the zone D where the SOC reaches nearly a maximum charged capacity, regeneration during deceleration and ENG disengagement are permitted on certain condition, and in the zone B and the zone C, EV driving and idling stop are prohibited. The zone A-M is controlled as a target charged capacity.

In the substitute control map Map2, the zone B is expanded to the region which is the zone A-L in the standard control map Map1. Namely, in the substitute control map Map2, the EV driving permitting region is narrowed when compared with the corresponding region in the standard control map Map1.

Figure 5:
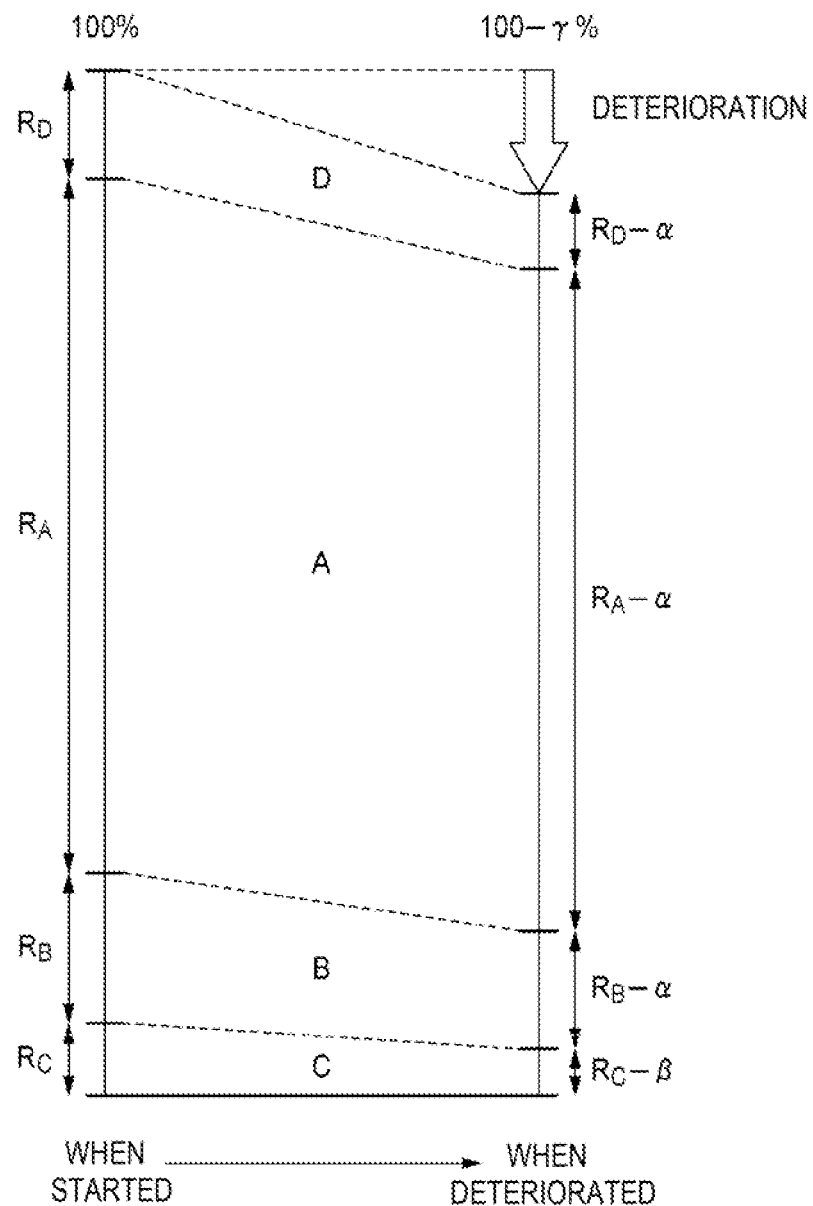
FIG. 5 is an explanatory diagram of control maps taking into account a deterioration of a battery.

The respective zones of the standard control map Map1 and the substitute control map Map2 change as the battery 3 deteriorates. As shown in FIG. 5, let's assume that with an initial SOC referred to as 100%, the SOC of the battery 3 is reduced from 100% to $\gamma$% as a result of deterioration with time. Then, with a reduction rate in the zone A, the zone B and the zone D referred to $\alpha$% and a reduction rate in the zone C referred to as $\beta$%, $\alpha$ and $\beta$ are set invariably so as to be put in a relation of $\beta<\alpha$. Although the reduction rate in the zone A, the zone B and the zone D is described as being constant, the invention is not limited thereto, and hence, the respective reduction rates of these zones may be set as required. However, the reduction rate in the zone C must be set to be the least. By making the reduction rate in the zone C where the engine can be started smaller than those of the other zones in this way, even when the SOC of the battery 3 is reduced, the engine 6 can be started by the motor 7 in an ensured fashion.

With the vehicle driving system 1 configured in the way described heretofore, by controlling the engagement and disengagement of the lock mechanism 61, and the first and second clutches 41, 42 and controlling the engaging positions of the first and second odd-numbered gear selection shifters 51A, 51B, the first and second even-numbered changing shifters 52A, 52B, and the reverse shifter 53, the first to fifth-speed driving and the reverse driving can be performed by the engine 6.

In the first-speed driving, the driving force is transmitted to the driving wheels DW, DW by way of the first transmission path by applying the first clutch 41 and engaging the lock mechanism 61. In the second-speed driving, the driving force is transmitted to the driving wheels DW, DW by way of the second transmission path by applying the second clutch 42 and engaging the first even-numbered gear selection shifter 52A in the second speed engaging position. In the third-speed driving, the driving force is transmitted to the driving wheels DW, DW by way of the third transmission path by applying the first clutch 41 and engaging the first odd-numbered gear selection shifter 51A in the third speed engaging position.

In the fourth-speed driving, the driving force is transmitted to the driving wheels DW, DW by way of the second transmission path by engaging the second even-numbered gear selection shifter 52B. In the fifth-speed driving, the driving force is transmitted to the driving wheels DW, DW by way of the third transmission path by engaging the second odd-numbered gear selection shifter 51B. In the sixth-speed driving, the driving force is transmitted to the driving wheels DW, DW by way of the second transmission path by applying the second clutch 42 and engaging the first even-numbered gear selection shifter 52A in the sixth speed engaging position. In the seventh-speed driving, the driving force is transmitted to the driving wheels DW, DW by way of the third transmission path by applying the first clutch 41 and engaging the first odd-numbered gear selection shifter 51A in the seventh speed engaging position. The reverse driving is performed by way of the fifth transmission path by applying the second clutch 42 and engaging the reverse shifter 53.

By engaging the lock mechanism 61 or pre-shifting the first and second odd-numbered gear selection shifters 51A, 51B and the first and second even-numbered gear selection shifters 52A, 52B, the motor 7 can assist in driving the vehicle or perform energy regeneration while the engine driving is being performed, and further, the motor 7 can start the engine 6 even during the non-idling state and charge the battery 3. The EV driving can be performed by the motor 7 by releasing the first and second clutches 41, 42. The following EV modes exist as driving modes of the EV driving. They are: a first-speed EV mode in which the vehicle is driven by way of the fourth drive transmission by releasing the first and second clutches 41, 42 and engaging the lock mechanism 61; a third-speed EV mode in which the vehicle is driven by way of the fourth transmission path by engaging the first odd-numbered gear selection shifter 51A in the third speed engaging position; a fifth-speed EV mode in which the vehicle is driven by way of the fourth transmission path by engaging the second odd-numbered gear selection shifter 51B in the fifth speed engaging position; and a seventh-speed EV mode in which the vehicle is driven by way of the fourth transmission path by engaging the first odd-numbered gear selection shifter 51A in the seventh speed engaging position.

The electric air conditioning compressor 112A is driven by employing the motor which is different from the electric motor 7 as a drive source, and therefore, the electric air conditioning compressor can operate irrespective of the driving conditions of the engine 6 and the electric motor 7 or the gear engaged in the transmission 20.

As an example of an EV driving, a third-speed EV driving will be described by reference to FIGS. 7A and 7B.

Figure 7A:
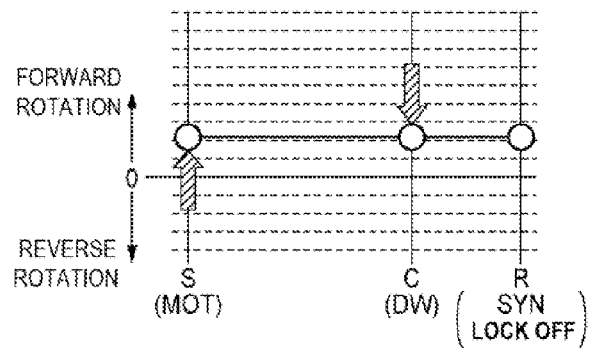
FIGS. 7A and 7B show a third-speed EV driving.
Figure 7B:
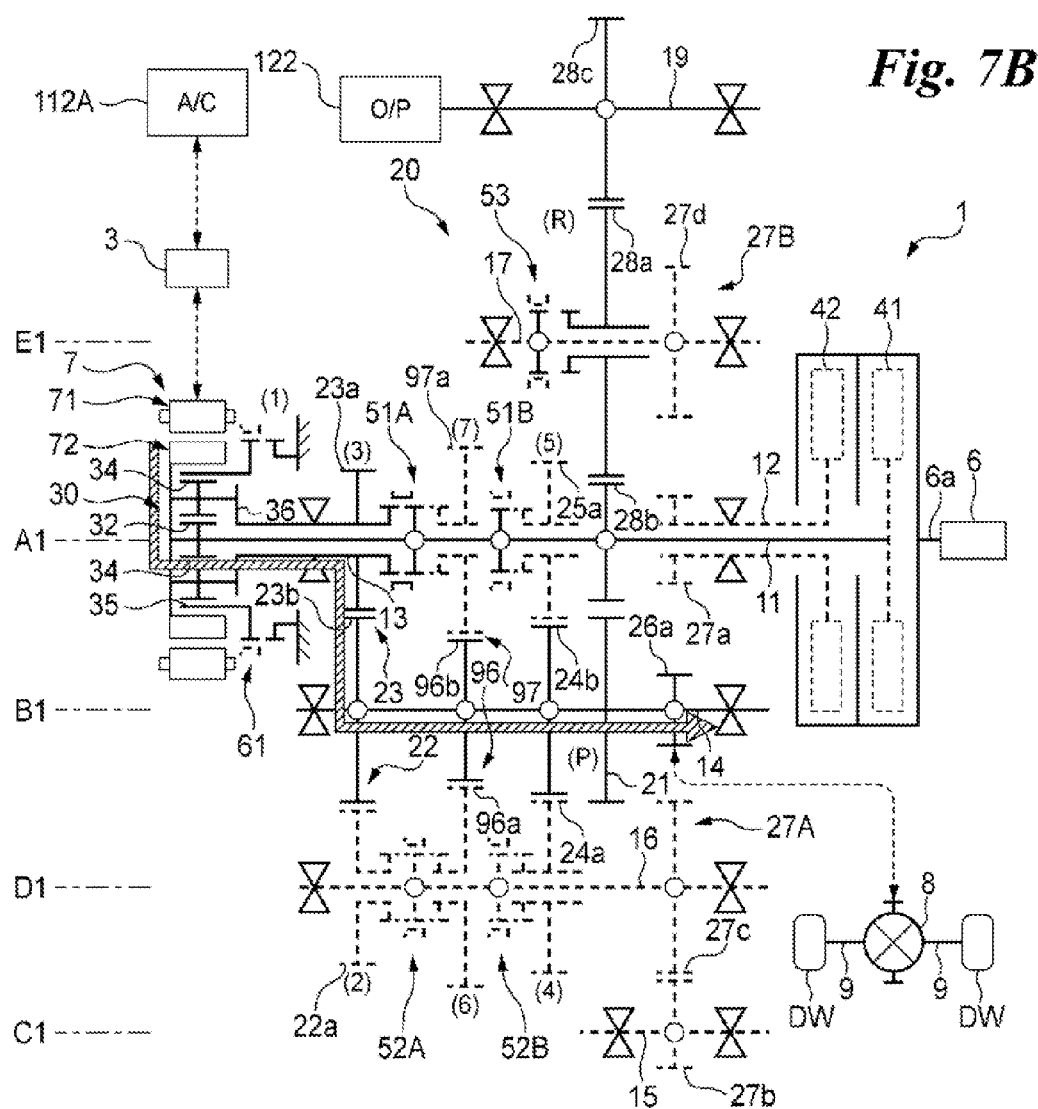

In the third-speed EV mode, as described above, by driving the motor 7 (applying torque in a forward rotating direction) with the first odd-numbered gear selection shifter 51A engaged in the third speed engaging position, the planetary gear mechanism 30 connected to the rotor 72 rotates in the forward rotating direction as a whole, as shown in FIG. 7A. As this occurs, since the first and second clutches 41, 42 are released, the driving force transmitted to the sun gear 32 is not transmitted from the first main shaft 11 to the crankshaft 6a of the engine 6, while motor torque is transmitted to the driving wheels DW, DW by way of the fourth transmission path which passes through the third-speed gear 23 as shown in FIG. 7B, whereby the EV driving is performed.

Then, when an air conditioner actuation request is made during this EV driving, the electric air conditioning compressor 112A is actuated by the control unit 2.

Figure 6:
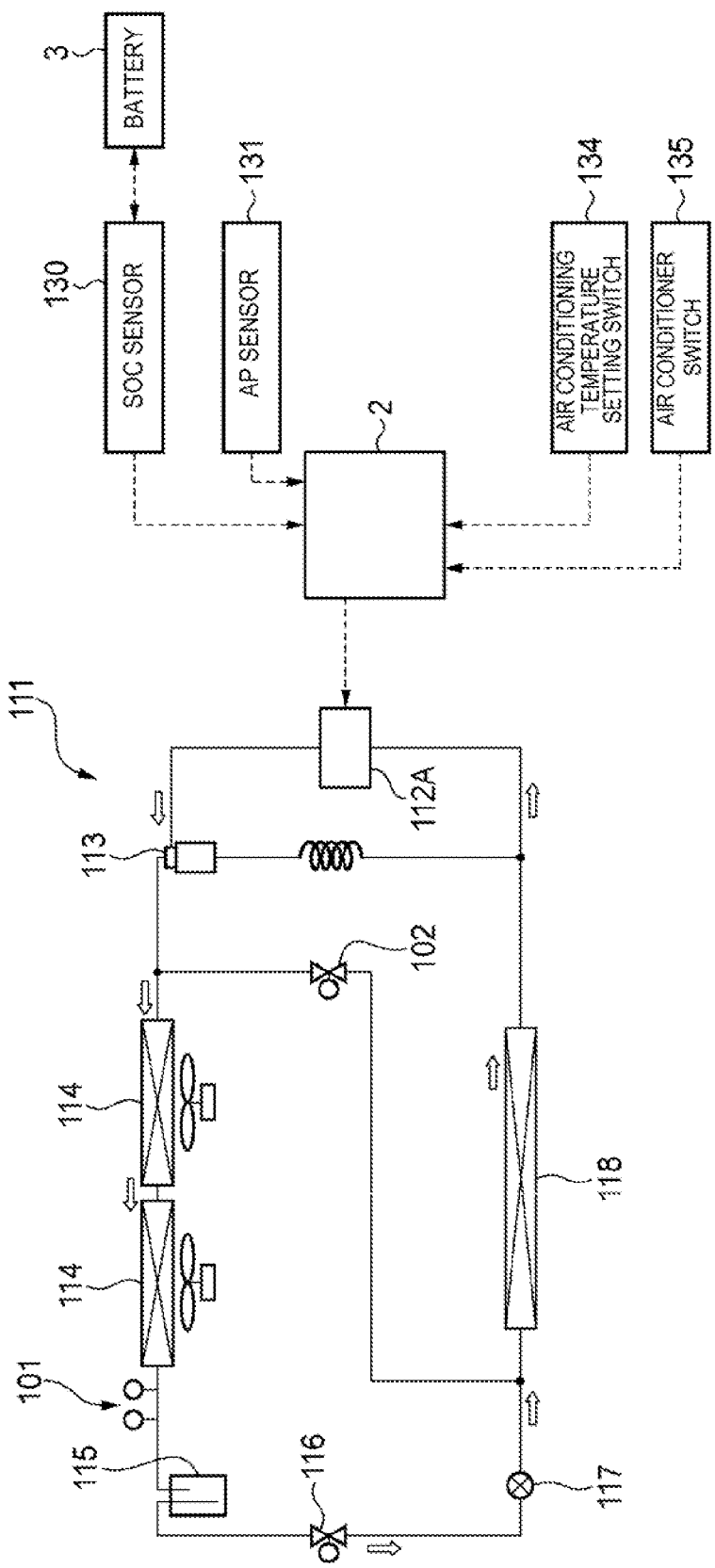
FIG. 6 is a schematic diagram of the configuration of a refrigeration cycle and the control unit of the invention.

A refrigeration cycle 111 including the electric air conditioning compressor 112A is formed by connecting constituent elements thereof by refrigeration piping so that a refrigerant circulates a path made up of the constituent element in the order of a discharge portion of the electric air conditioning compressor 112A→ an oil separator 113→ a condenser 114→ a receiver 115→ a refrigeration valve 116→ an expansion valve 117→ an evaporator 118→ a suction port of the electric air conditioning compressor 112A, as shown in FIG. 6. In the figure, reference numeral 101 denotes a pressure switch which can change the pressure in the refrigeration piping, and reference numeral 102 denotes a defrosting valve which frees the evaporator 118 of accumulated ice.

While the electric air conditioning compressor 112A is in operation, the refrigerant which is compressed and heated by the electric air conditioning compressor 112A is sent to the condenser 114 where the refrigerant is freed of heat and is condensed to liquid, whereafter the liquid refrigerant is sent to the expansion valve 117 by way of the receiver 115 and the refrigeration valve 116. Then, in the expansion valve 117, the liquid refrigerant is expanded into low-temperature and low-pressure mist. Thereafter, the mist is sent to the evaporator 118. In this evaporator 118, the mist refrigerant is evaporated into gas, whereby the evaporator 118 is cooled by latent heat of vaporization. This cools air which flows along the evaporator 118, and the cooled air is then blown out into the passenger compartment. The refrigerant vaporized in the evaporator 118 is sucked from the evaporator 118 into the electric air conditioning compressor 112A for compression and is then sent to the condenser 114. Thus, this series of actions is repeated.

The control unit 2 which controls the actuation and stop of the electric air conditioning compressor 112A reads in output signals from an SOC sensor 130 which detects the SOC of the battery 3, an AP sensor 131 which detects an accelerator pedal depression amount, an air conditioning temperature setting switch 134 which sets an air conditioning temperature (a cooling temperature), and an air conditioner switch 135 which switches on and off of the air conditioning operation, so as not only to perform a gear selection control based on a gear selection map but also to control the actuation and stop of the electric air conditioning compressor 112A through PWM control so that the temperature in the passenger compartment is controlled to the set air conditioning or cooling temperature while the air conditioning is in operation (while the air conditioner switch 135 is on).

In the standard control map Map1 shown in FIG. 3, for example, with the SOC of the battery 3 staying in the zone A-L, when the electric air conditioning compressor 112A continues to operate to thereby reduce the SOC further, the SOC enters the zone B where the electric driving is prohibited, which requires the engine 6 to be started so that the EV driving is switched to the engine driving. In the standard control map Map1, since the zone B is not given a sufficient margin, even when the engine driving is performed with the SOC staying in the zone B, the SOC may reduce quickly to enter the zone C.

<First Embodiment>

Then, a control unit 2 according to a first embodiment is configured so that when an air conditioner actuating request is made, the control map to be referred to is switched from the standard control map Map1 to the substitute control map Map2 for performing the driving control. In this substitute control map Map2, since the zone B is expanded to the region which is the zone A-L in the standard control map Map1, when the SOC of the battery 3 reduces further from the zone A-M, the engine 6 is started so that the driving mode is shifted to the engine driving. Thus, the substitute control map Map2 can reduce the opportunity for the SOC to enter the zone C where the SOC is reduced to an extremely low level due to the expanded zone B. In this way, in this embodiment, when the request is made to actuate the electric air conditioning compressor 112A, which constitutes a relatively large load, the substitute control map Map2 is selected to be referred to in place of the standard control map Map1, so that the EV driving permitting region is narrowed to start the engine driving earlier, whereby the SOC of the battery 3 is made difficult to shift to the zone C, thereby providing a margin in controlling the SOC.

While the driving control is being performed based on the standard control map Map1 or the substitute control map Map2, when the SOC enters the zone B where the EV driving is prohibited, the first clutch 41 is applied to start the engine 6 so that the driving mode is shifted to the engine driving. As this occurs, the gear selection map, which is preset based on the vehicle speed and the accelerator pedal depression amount, may be set to a charge preference mode. This charge preference mode is set so that the charging efficiency of the motor 7 takes priority, and hence, in this setting, the even-numbered gear driving by way of the second intermediate shaft 16, which is the input shaft to which the motor 7 is not coupled, is selected in preference.

Figure 8:
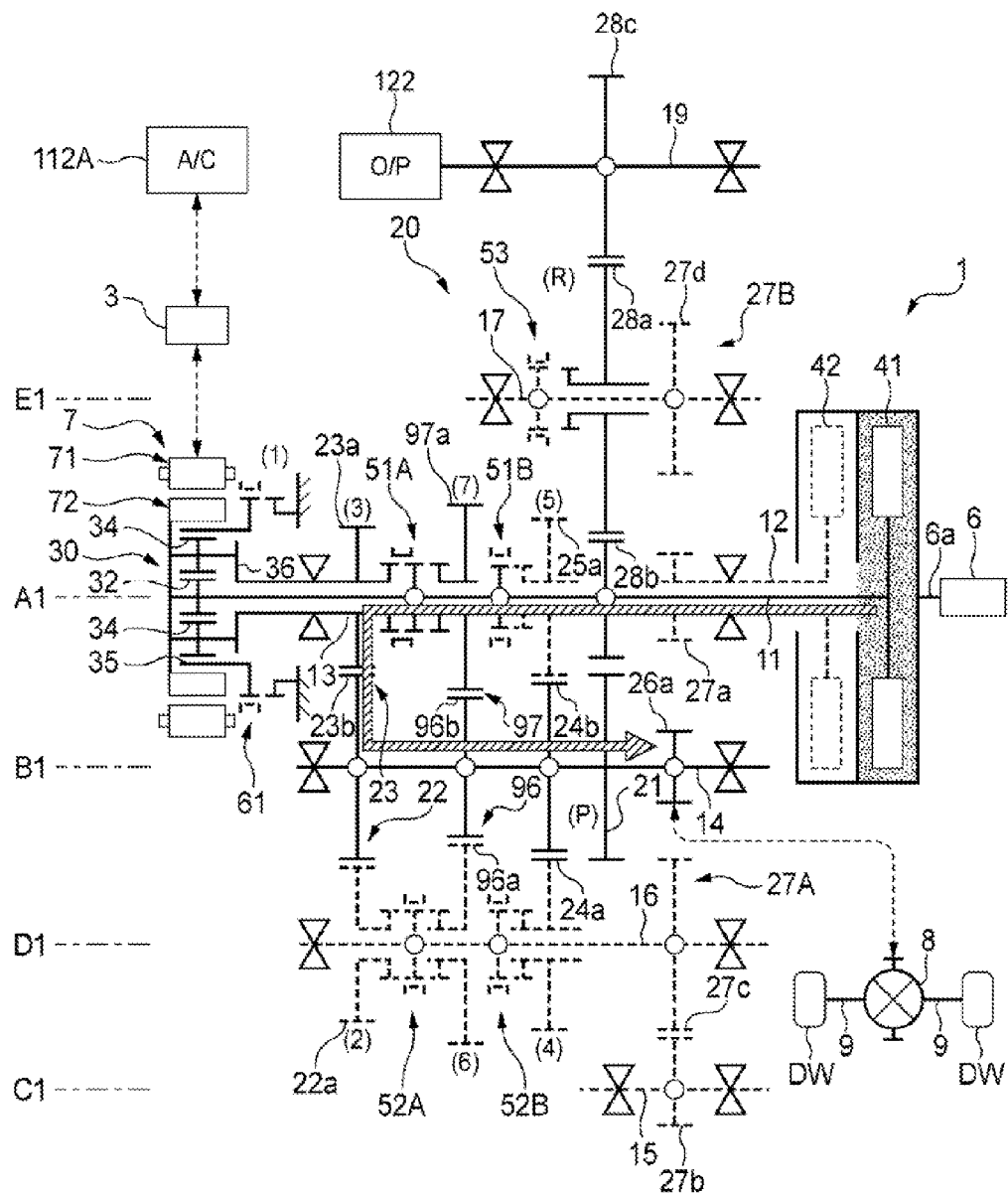
FIG. 8 is a diagram showing a torque transmitting condition of the vehicle driving system when a third-speed driving is performed.
Figure 9:
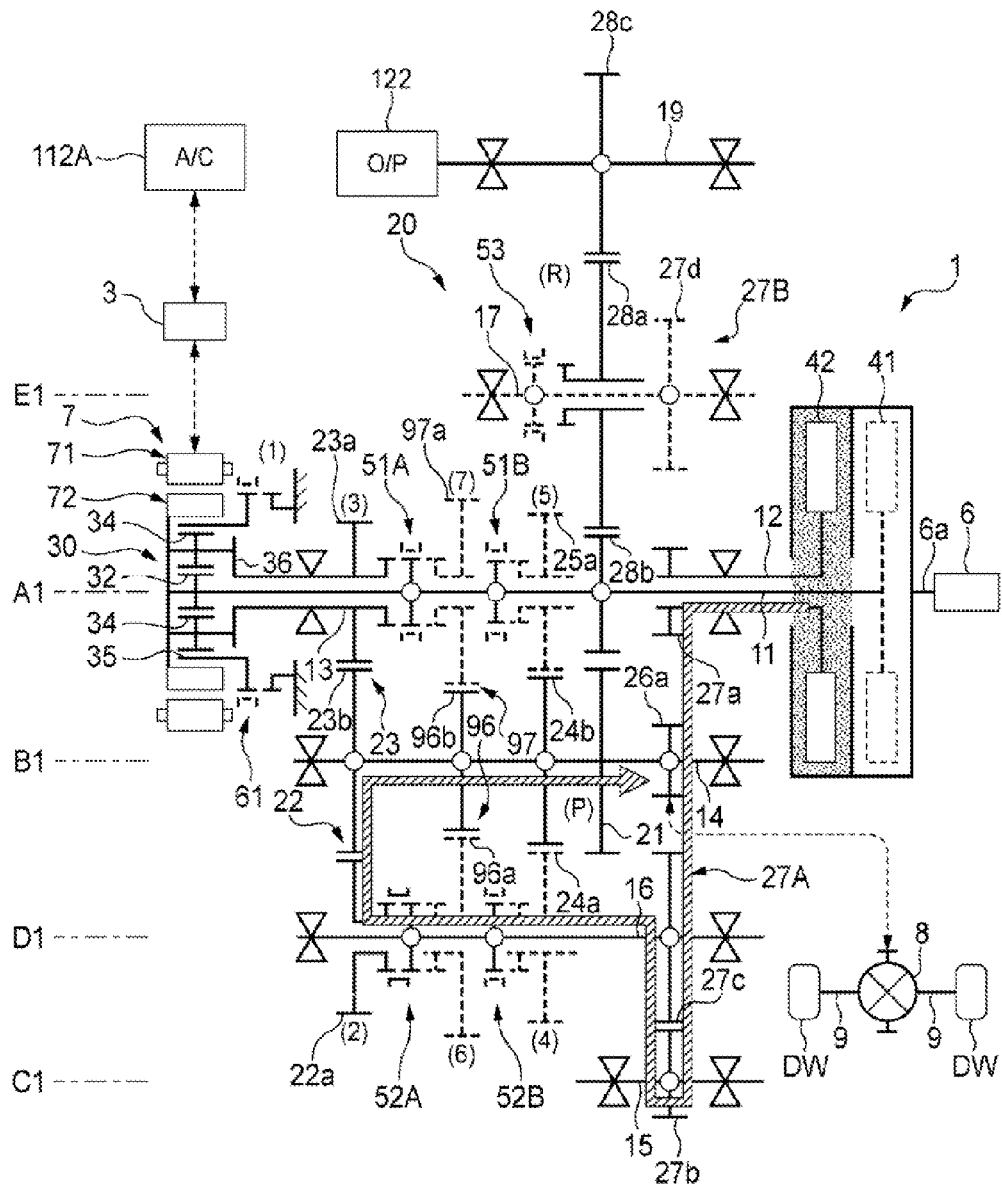
FIG. 9 is a diagram showing a torque transmitting condition of the vehicle driving system when a second-speed driving is performed.
Figure 10:
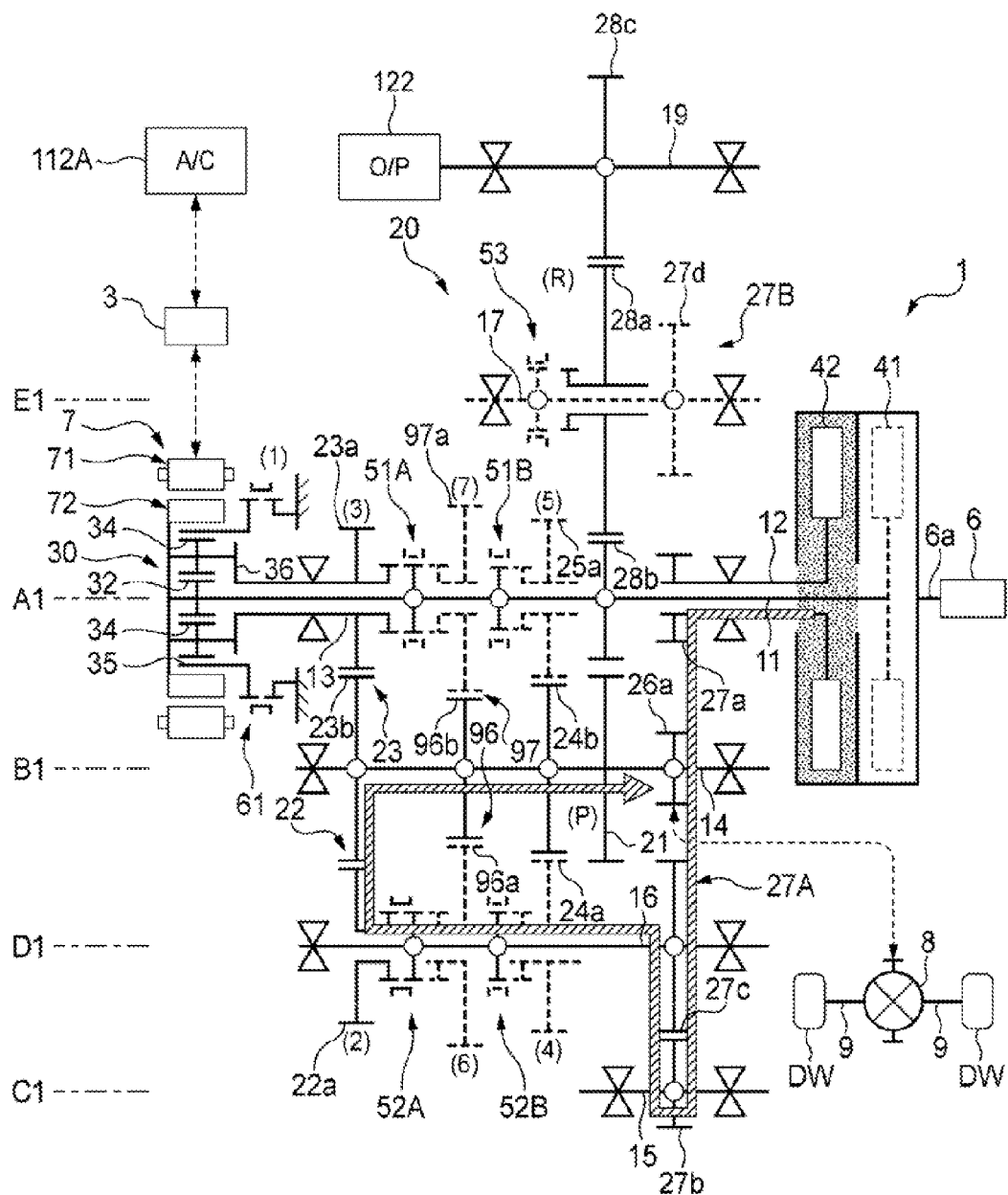
FIG. 10 is a diagram showing a torque transmitting condition of the vehicle driving system when a first-speed preshift is performed during the second-speed driving.

For example, in the normal gear selection map, the second-speed driving takes priority in the region where the second-speed or the third-speed driving can be performed, and the fourth-speed driving takes priority in the region where the third-speed or the fourth-speed driving can be performed. To describe this specifically, when the SOC of the battery 3 enters the zone B while the vehicle is running based on a third-speed EV driving shown in FIGS. 7A and 7B, in the event that a third-speed driving shown in FIG. 8 is selected, the motor 7 rotates at the rotation speed of the first main shaft 11 which rotates according to the vehicle speed based on the gear ratio f the third-speed gear 23. However, when the second-speed driving shown in FIG. 9 is selected, as shown in FIG. 10, by engaging the lock mechanism 61 to lock the rotation of the ring gear 35 (performing the first-speed pre-shifting), the rotation speed of the first main shaft 11 can be increased by the gear ratio of the planetary gear mechanism 30, thereby increasing the regeneration capacity of the motor 7. On the other hand, when the temperature of the motor 7 is increased to a high temperature as a result of the EV driving, any of the third-speed drive gear 23a, the fifth-speed drive gear 25a and the seventh-speed drive gear 97a is coupled to the first main shaft 11 by the first odd-numbered gear selection shifter 51A or the second odd-numbered gear selection shifter 51B, the battery 3 can be charged while decreasing the rotation speed of the first main shaft 11. In this way, by selecting the even-numbered gear driving in preference, the charged capacity is increased by increasing the rotation speed of the first main shaft, or the rotation speed of the first main shaft 11 is decreased depending upon the conditions of the motor 7. Thus, various conditions can be dealt with by adjusting the shift position with the driving gear engaged remaining unchanged.

On the other hand, when the odd-numbered driving is selected while the charge preference mode is selected, for example, when the vehicle is running based on the third-speed driving shown in FIG. 8, by releasing the first clutch 41, the regeneration of energy can be dealt with only by the motor 7. Thus, compared with the state in which the first clutch 41 is kept applied, the charged capacity of the motor 7 can be increased by the load of the engine 6.

Thus, as has been described heretofore, according to this embodiment, the control unit 2 is provided for the vehicle driving system 1 including the engine 6, the motor 7, the battery 3 which supplies electric power to the motor 7, the transmission 20 including in turn the first main shaft 11 which is the first input shaft that is connected to the motor 7 and which is selectively connected to the engine 6 by way of the first clutch 41, the second intermediate shaft 16 which is the second input shaft which is selectively connected to the engine 6 by way of the second clutch 42, and the counter shaft 14 that is selectively coupled with the first main shaft 11 by way of the odd-numbered gear selection unit and which is selectively coupled with the second intermediate shaft 16 by way of the even-numbered gear selection unit, and the electric air conditioning compressor 112A, and this control unit 2 for the vehicle driving system 1 includes the standard control map Map1 in which the EV driving permitting region is set according to the SOC of the battery 3 and the substitute control map Map2 in which the EV driving permitting region of the standard control map Map1 is narrowed, whereby when the electric air conditioning compressor 112A is actuated, the driving control is performed by selecting the substitute control map Map2 to be referred to in place of the standard control map Map1. Therefore, the SOC of the battery 3 is made difficult to shift to the zone C where the SOC is reduced to the least level, thereby providing a margin in controlling the SOC.

According to this embodiment, when the battery 3 starts to deteriorate, by setting the falling rate of the threshold of the zone C where the engine can be started by the motor 7 smaller than those of the thresholds of the other zones such as the zone A, the zone B, and the zone D, even when the SOC reduces, the engine start by the motor 7 can be performed in an ensured fashion.

In the vehicle driving system 1, when the driving mode is shifted from the EV driving to the engine driving, the engine 6 needs to be started by the motor 7. To describe this by taking the third-speed driving shown in FIGS. 7A and 7B for example, the crankshaft 6a can be entrained to start the engine 6 by applying the first clutch 41 while the vehicle is running based on the third-speed EV driving. However, when the driving mode is shifted from the EV driving to the engine driving frequently, it follows that electric power is consumed accordingly to thereby reduce the SOC of the battery 3. Consequently, it is preferable to suppress the frequent occurrence of the shifting in driving mode from the EV driving to the engine driving.

<Second Embodiment>

Then, according to a control unit 2 of a second embodiment, which differs from the first embodiment, although the driving control is initially performed based on the standard control map Map1 even though an air conditioner actuating request is made, once the SOC enters the zone B from the zone A-L during the EV driving whereby the driving mode is shifted to the engine driving, the vehicle control is performed by selecting the substitute control map Map2 to be referred to in place of the standard control map Map1. Then, when the SOC enters again the zone A-M from the zone B whereby the driving mode is shifted from the engine driving to the EV driving, the driving control is performed based on the standard control map Map1 which is originally employed.

If the vehicle continue to be controlled based on the standard control map Map1, even when the SOC shifts from the zone B to the zone A-L whereby the driving mode is shifted from the engine driving to the EV driving, in the event that the SOC of the battery 3 reduces further from the zone A-L, the SOC quickly returns to the zone B, which requires the driving mode to be shifted from the EV driving to the engine driving.

In contrast with this, according to this embodiment, when the SOC shifts from the zone B to the zone A-M based on the substitute control map Map2 whereby the driving mode shifts from the engine driving to the EV driving, next time, the driving mode shifts from the EV driving to the engine driving based on the standard control map Map1 when the SOC shifts from the zone A-L to the zone B. Therefore, the EV driving permitting region can be ensured wider by the zone A-L of the standard control map Map1. This can suppress the consumption of electric power associated with the start of the engine 6 caused by the frequent occurrence of the shifting in driving mode from the EV driving to the engine driving.

Also in this embodiment, similar to the first embodiment, it is preferable to change the gear selection map to the charge preference mode after the shifting in driving mode from the EV driving to the engine driving.

Thus, as has been described heretofore, according to the embodiment, the control unit 2 is provided for the vehicle driving system 1 including the engine 6, the motor 7, the battery 3 which supplies electric power to the motor 7, the transmission 20 including in turn the first main shaft 11 which is the first input shaft that is connected to the motor 7 and which is selectively connected to the engine 6 by way of the first clutch 41, the second intermediate shaft 16 which is the second input shaft which is selectively connected to the engine 6 by way of the second clutch 42, and the counter shaft 14 that is selectively coupled with the first main shaft 11 by way of the odd-numbered gear selection unit and which is selectively coupled with the second intermediate shaft 16 by way of the even-numbered gear selection unit, and the electric air conditioning compressor 112A, and this control unit 2 for the vehicle driving system 1 includes the standard control map Map1 in which the EV driving permitting region is set according to the SOC of the battery 3 and the substitute control map Map2 in which the EV driving permitting region of the standard control map Map1 is narrowed, whereby the driving control is performed by selecting the substitute control map Map2 to be referred to in place of the standard control map Map1 when the driving mode is shifted from the EV driving to the engine driving as a result of the SOC entering from the zone A-L which is the EV driving permitting region to the zone B which is the EV driving prohibiting region while the air conditioning compressor is in operation, and the driving control is performed by selecting the first map to be referred to in place of the second map when the driving mode is shifted from the internal combustion engine driving to the EV driving as a result of the SOC entering again the zone A-M which is the EV driving permitting region from the zone B which is the EV driving prohibiting region. Thus, the consumption of electric power associated with the start of the internal combustion engine caused by the frequent occurrence of the shifting in driving mode between the EV driving and the internal combustion engine driving can be suppressed.

Also according to this embodiment, when the battery 3 starts to deteriorate, by setting the falling rate of the threshold of the zone C where the engine can be started by the motor 7 smaller than those of the thresholds of the other zones such as the zone A, the zone B, and the zone D, even when the SOC reduces, the engine start by the motor 7 can be performed in an ensured fashion.

Figure 12:
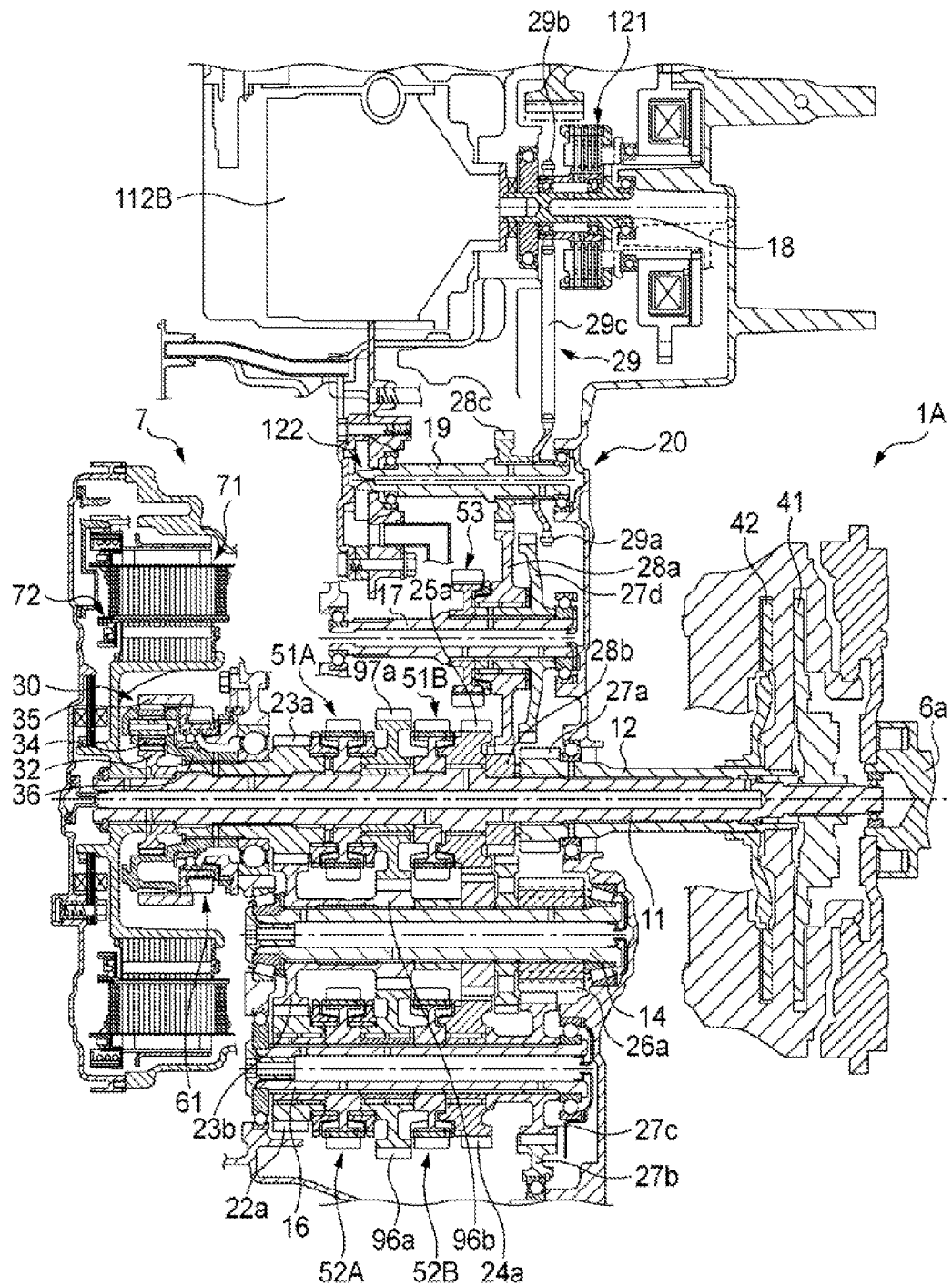
FIG. 12 is a sectional view showing another example of a vehicle driving system to which the control unit of the invention can be applied.
Figure 13:
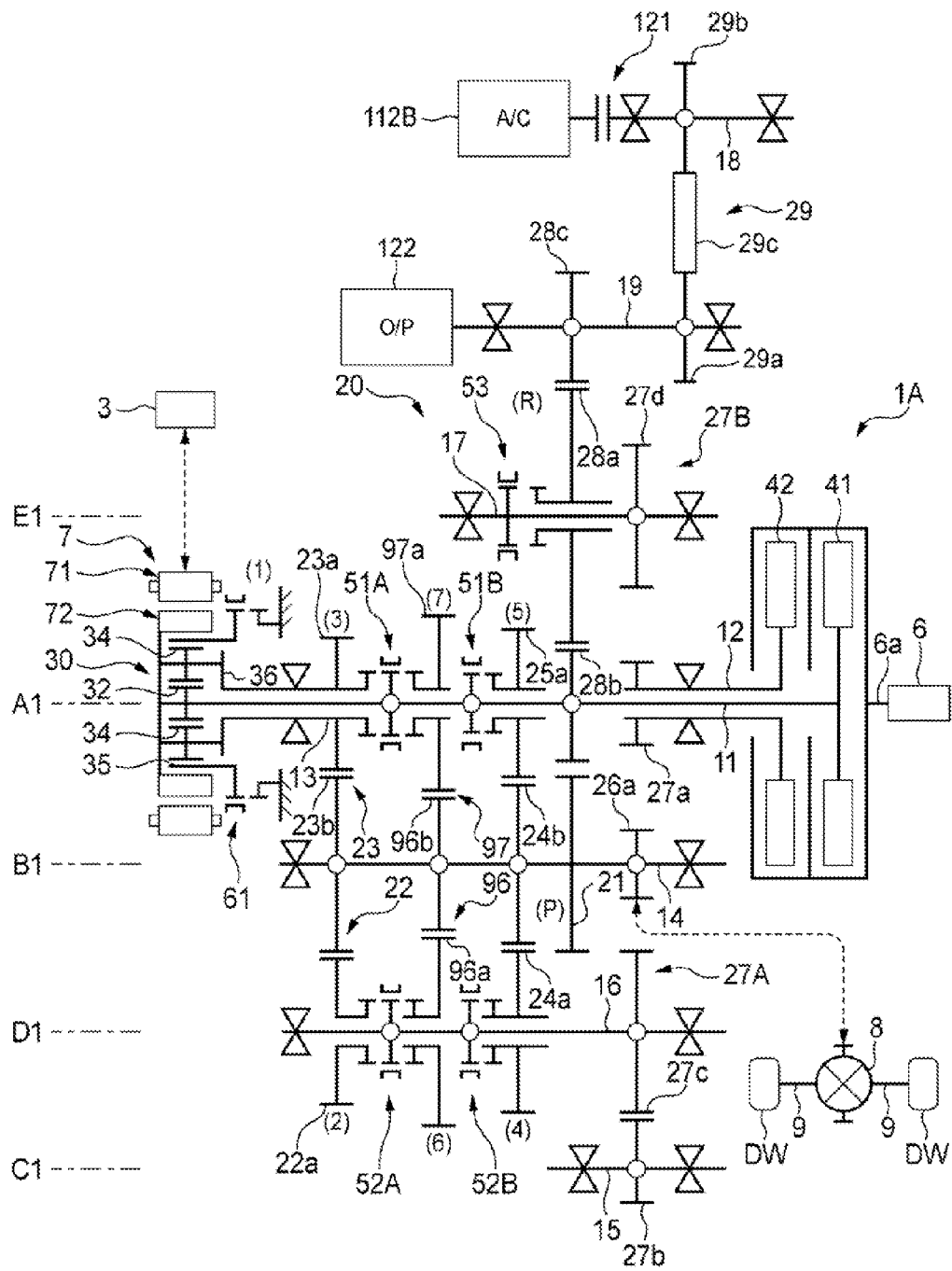
FIG. 13 is a schematic block diagram of the vehicle driving system shown in FIG. 12.

FIG. 12 is a sectional view of another vehicle driving system to which the control unit of the invention can be applied, and FIG. 13 is a schematic block diagram of the vehicle driving system shown in FIG. 12.

In this vehicle driving control system 1A, an air conditioning compressor 112B is provided in place of the electric air conditioning compressor 112A, which electric air conditioning compressor 112B can be operated by a driving force transmitted from a transmission 20. Specifically, the air conditioning compressor 112B is provided via an air conditioning clutch 121 on an air conditioning auxiliary shaft 18 which is disposed parallel to rotational axes A1 to E1. An air conditioning driven gear 29b, a driving force is transmitted from an air conditioning drive gear 29a provided on an oil pump auxiliary shaft 19 by way of a chain 29c, is mounted on the air conditioning auxiliary shaft 18 so as to rotate together with the air conditioning auxiliary shaft 18, whereby the driving force of an engine 6 and/or a motor 7 is transmitted from the oil pump auxiliary shaft 19 by way of an air conditioning transmission mechanism 29 which is made up of the air conditioning drive gear 29a, the chain 29c and the air conditioning driven gear 29b. The air conditioning compressor 112B is configured so that the transmission of the driving force can be interrupted by engaging or disengaging an air conditioning clutch 121 by an air conditioner actuating solenoid, now shown.

Since this air conditioning compressor 112B is coupled with a first main shaft 11, when the vehicle is driven in an odd-numbered gear, the first main shaft 11 rotates inevitably, whereby the air conditioning compressor 112B can be actuated to operate. However, in order to actuate the air conditioning compressor 112B to operate when the vehicle is driven in an even-numbered gear, (i) the first main shaft 11 needs to be rotated by the motor 7 by engaging an odd-numbered gear selection unit in a neutral position, (ii) the first main shaft 11 needs to be rotated by pre-shifting any constituent gear of the odd-numbered gear selection unit, or (iii) the first main shaft 11 needs to be rotated by the engine 6 by engaging the odd-numbered gear selection unit in the neutral position and applying a first clutch 41.

Consequently, when an air conditioner actuating request is made, the air conditioning compressor 112B can be actuated to operate by applying the air conditioning clutch 121 whether the vehicle is running with the odd-numbered gear selection section engaged or the vehicle is running with the even-numbered gear selection section engaged.

Then, when the air conditioner actuating request is made during the EV driving, the air conditioning clutch 121 is applied by the control unit 2, and the rotation of the first main shaft 11 is transmitted in the above-described way, whereby the air conditioning compressor 112B is actuated to operate.

Also in the vehicle driving system 1A including the air conditioning compressor 112B which can be actuated to operate by the driving force transmitted from the transmission 20, similar to the first embodiment, when the air conditioner actuating request is made, the driving of the vehicle is controlled by selecting a substitute control map Map2 to be referred to in place of a standard control map Map1, whereby when the SOC of the battery 3 reduces further from a zone A-M, the engine 6 is started so as to perform the engine driving. Therefore, a zone B is widened to thereby reduce the opportunity for the SOC to enter a zone C where the SOC is reduced to an extremely low level.

Similar to the second embodiment, when the SOC enters the zone B which is an EV driving prohibiting region from a zone A-L which is an EV driving permitting region during the operation of the air conditioning compressor 112B whereby the driving mode is shifted from the EV driving to the engine driving, the driving of the vehicle is controlled by selecting the substitute control map Map2 to be referred to in place of the standard control map Map1. When the SOC enters again the zone A-M which is the EV driving permitting region from the zone B which is the EV driving prohibiting region whereby the driving mode is shifted from the engine driving to the EV driving, the driving of the vehicle is controlled by selecting the standard control map Map1 to be referred to in place of the substitute control map Map2, thereby suppressing the consumption of electric power associated with the start of the internal combustion engine caused by the frequent occurrence of the shifting in driving mode between the EV driving and the internal combustion engine driving.

In the vehicle driving control system 1A, even when the substitute control map Map2 is selected to be referred to, in the event that a cooling performance of the air conditioning compressor 112B which is determined based on the rotation speed thereof is higher than a required cooling performance from an air conditioning temperature setting switch 134 and the off state period in a PWM control is equal to or larger than a predetermined number of times, the control unit 2 may select the standard control map Map1 to be referred to in place of the substitute control map Map2. Namely, when the cooling performance of the air conditioning compressor 112B which is determined based on the rotation speed thereof is higher than the required cooling performance to such an extent that a margin is held in the cooling performance of the air conditioning compressor 112B, the driving of the vehicle is controlled based on the standard control map Map1 without narrowing the EV driving permitting region, whereby the improvement in fuel economy by the EV driving can be made use of effectively.

Figure 11:
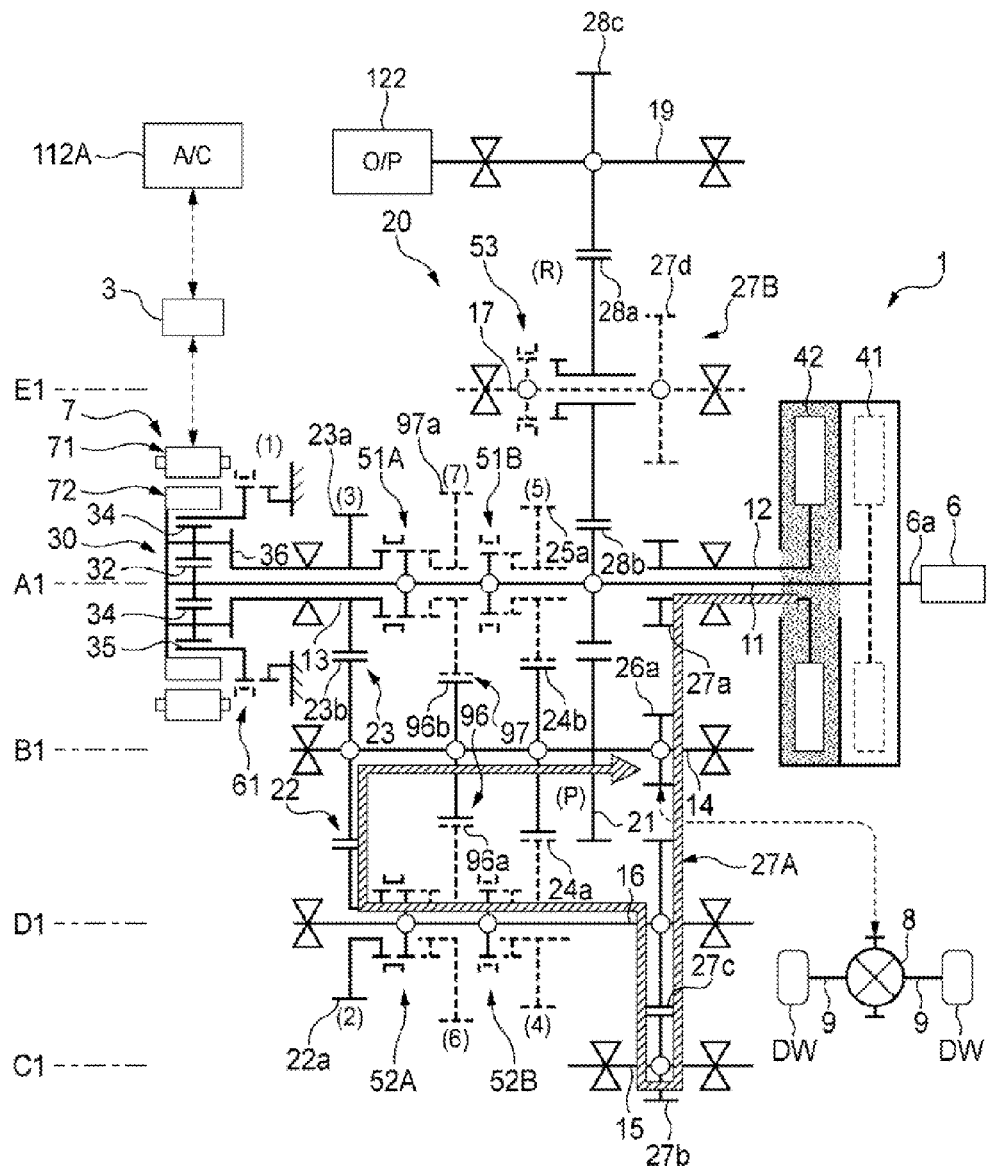
FIG. 11 is a diagram showing a torque transmitting condition of the vehicle driving system when a third-speed preshift is performed during the second-speed driving.

Whether the vehicle is running based on the normal gear selection map or is running based on the gear selection map which is changed to a charge preference mode, when the cooling performance of the air conditioning compressor 112B which is determined from the rotation speed thereof is lower a predetermined deviation or more than the required cooling performance, it is preferable the gears are changed to the low speed gears instead of increasing the on state period in the PWM control or the gears are pre-shifted to the lower gears without changing the gears. For example, by shifting from the state of the second-speed driving with the third-speed pre-shifting shown in FIG. 11 to the state of the second-speed driving with the first-speed pre-shifting shown in FIG. 10, the rotation speed of the first main shaft 11 with which the air conditioning compressor 112B is coupled is increased, thereby increasing the cooling performance of the air conditioning compressor 112B.

The invention is not limited to the above-described embodiments and hence can be modified or improved as required.

For example, in the vehicle driving system 1, the odd-numbered gears are disposed on the first main shaft 11 which is the input shaft to which the motor 7 of the twin clutch type transmission is connected, whereas the even-numbered gears are disposed on the second intermediate shaft 16 which is the input shaft to which the motor 7 is not connected. However, the invention is not limited thereto, and hence, a configuration may be adopted in which the even-numbered gears are disposed on the first main shaft 11 which is the input shaft to which the motor 7 is connected, whereas the odd-numbered gears are disposed on the second intermediate shaft 16 which is the input shaft to which the motor 7 is not connected.

The driven gears which are mounted on the counter shaft 14 are such as the first common driven gear 23b which commonly meshes with the second-speed drive gear 22a and the third-speed drive gear 23a, the third common driven gear 24b which commonly meshes with the fourth-speed drive gear 24a and the fifth-speed drive gear 25a and the second common driven gear 96b which commonly meshes with the sixth-speed drive gear 96a and the seventh-speed drive gear 97a. However, the invention is not limited thereto, and hence, plural driven gears may be provided which individually mesh with the individual gears. Although the planetary gear mechanism 30 is described as the first-speed drive gear, the invention is not limited thereto, and hence, similar to the third-speed drive gear 23a, a first-speed drive gear may be provided.

As the odd-numbered change-speed gears, other gears may be added to the planetary gear mechanism 30 as the first-speed drive gear, the third-speed drive gear 23a, the fifth-speed drive gear 25a and the seventh-speed drive gear 97a or the number of gears may be reduced. Similarly, as the even-numbered change speed gears, other gears may be added to the second-speed drive gear 22a, the fourth-speed drive gear 24a and the sixth-speed drive gear 96a or the number of gears may be reduced.

Figure 14:
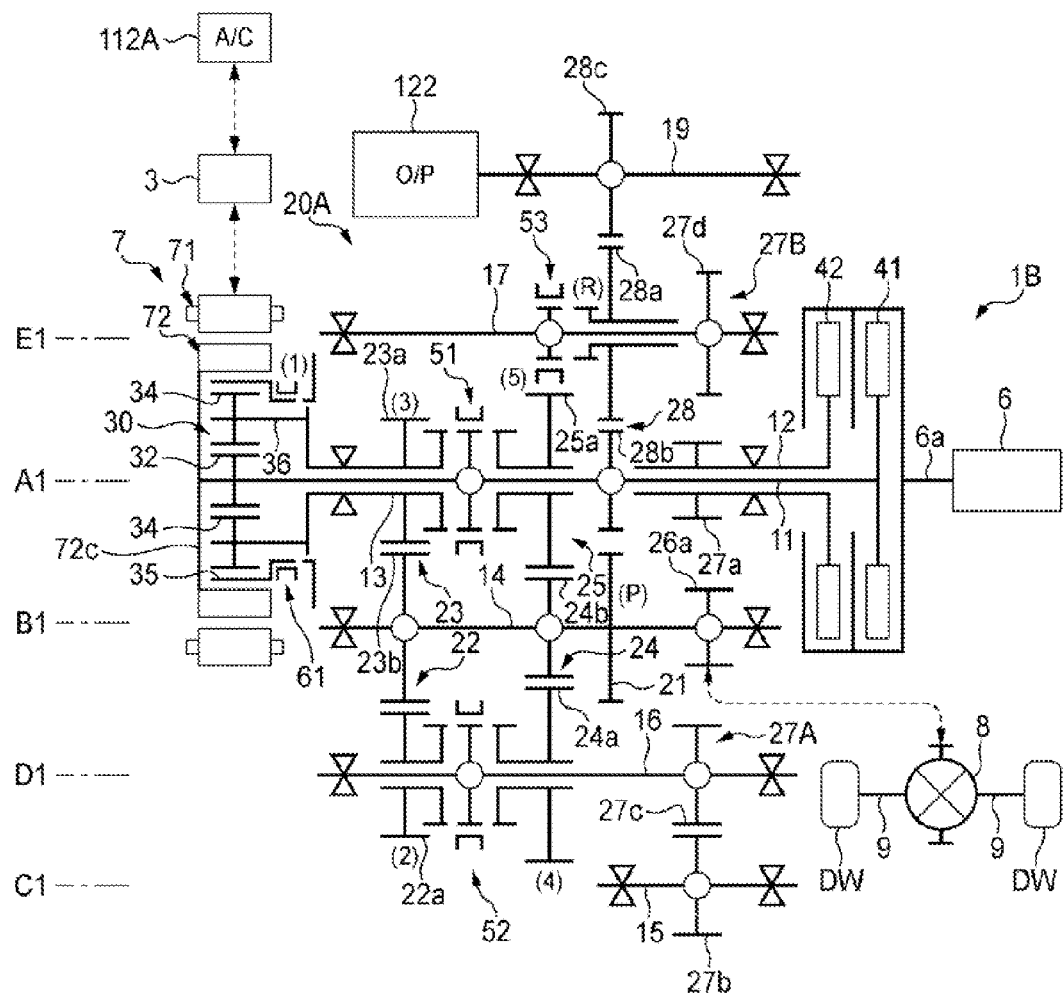
FIG. 14 is a schematic block diagram of a further example of a vehicle driving system to which the control unit of the invention can be applied.
Figure 15:
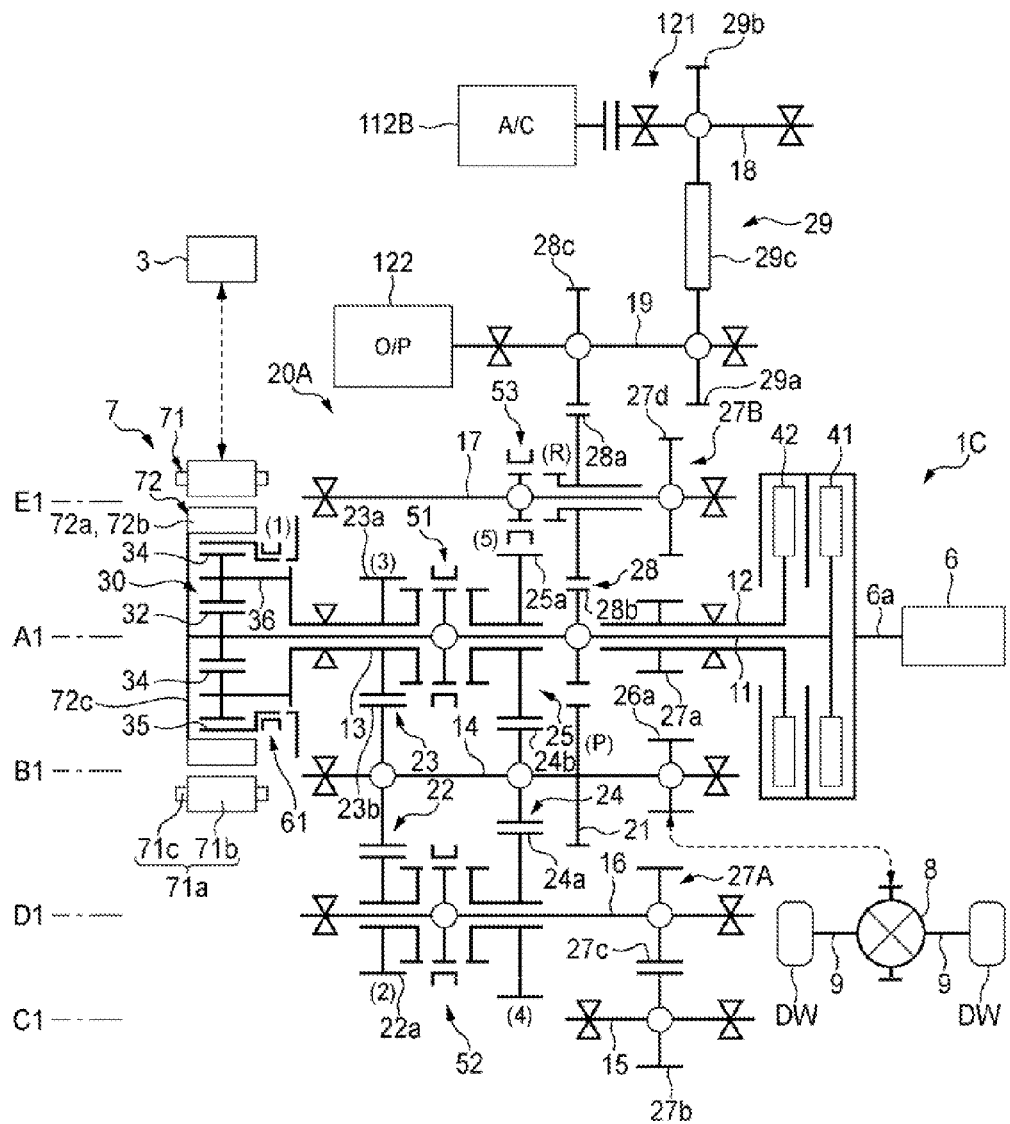
FIG. 15 is a schematic diagram showing a further example of a vehicle driving system to which the control unit of the invention can be applied.
Figure 16:
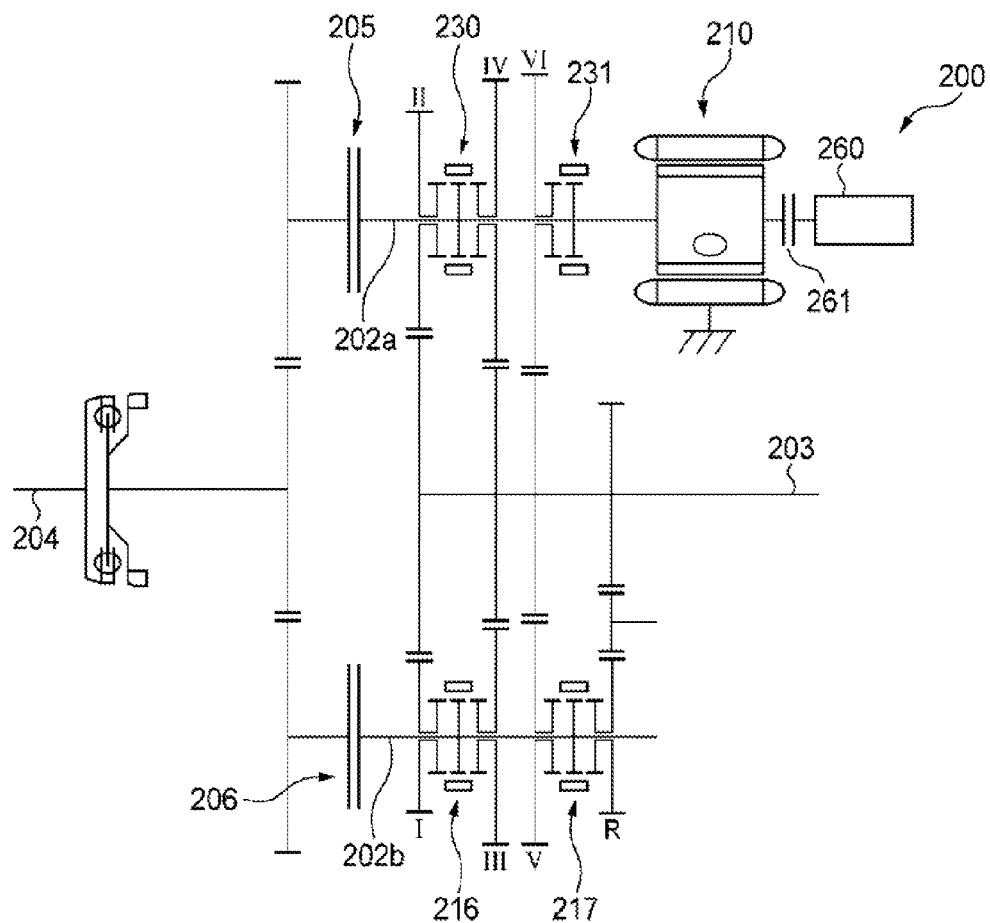
FIG. 16 is a schematic diagram of a vehicle driving system of Patent Literature 1.

FIG. 14 is a schematic block diagram of a vehicle driving system 1B which includes a transmission 20A made up of five change-speed gears and the electric air conditioning compressor 112A, and FIG. 15 is a schematic block diagram 1C which includes the transmission 20A made up of the five change-speed gears and the air conditioning compressor 112B which can be operated by the driving force transmitted form the transmission 20A. Like reference numerals will be given to like configurations to those shown in FIGS. 2 and 13, and the description thereof will be omitted.

In the transmission 20A shown in FIGS. 14 and 15, the sixth-speed gear 96 and the seventh-speed gear 97 are not provided. When an odd-numbered gear selection shifter 51 is engaged in a third speed engaging position, a first main shaft 11 and a third-speed drive gear 23a are coupled with each other so as to rotate together, and when the odd-numbered gear selection shifter 51 is engaged in a fifth speed engaging position, the first main shaft 11 and a fifth-speed drive gear 25a are coupled with each other so as to rotate together. When an even-numbered gear selection shifter 52 is engaged in a second speed engaging position, a second intermediate shaft 16 and a second-speed drive gear 22a are coupled with each other so as to rotate together, and when the even-numbered gear selection shifter 52 is engaged in a fourth speed engaging position, the second intermediate shaft 16 and a fourth-speed drive gear 24a are coupled with each other so as to rotate together.

This patent application is based on Japanese Patent Application (No. 2011-032913) filed on Feb. 18, 2011, the contents of which are incorporated herein by reference.

Description of Reference Numerals and Characters 1, 1A, 1B, 1C vehicle driving system; 2 control unit; 3 battery (battery unit); 6 engine (internal combustion engine); 7 motor (electric motor); 11 first main shaft (first input shaft); 14 counter shaft (output shaft); 16 second intermediate shaft (second input shaft); 20, 20A transmission (transmission mechanism); 22a second-speed drive gear; 23a third-speed drive gear; 23b first common driven gear; 24a fourth-speed drive gear; 24b third common driven gear; 25a fifth-speed drive gear; 30 planetary gear mechanism; 41 first clutch (first engaging and disengaging unit); 42 second clutch (second engaging and disengaging unit); 51 odd-numbered gear selection shifter (first gear selection device); 51A first odd-numbered gear selection shifter (first gear selection device); 51B second odd-numbered gear selection shifter (first gear selection device); 52 even-numbered gear selection shifter (second gear selection device); 52A first even-numbered gear selection shifter (second gear selection device); 52B second even-numbered gear selection shifter (second gear selection device); 61 lock mechanism (first gear selection device); 112A, 112B air conditioning compressor; 121 air conditioning clutch; Map1 standard control map; Map2 substitute control map.

The invention claimed is:
1. A control unit for a vehicle driving system,
the vehicle driving system including:
an internal combustion engine;
an electric motor;
a battery device which supplies electric power to the electric motor;
a transmission mechanism including
a first input shaft which is connected to the electric motor and which is selectively connected to the internal combustion engine via a first engaging and disengaging unit, a second input shaft which is selectively connected to the internal combustion engine via a second engaging and disengaging unit, and an output shaft which is selectively coupled with the first input shaft via a first gear selection device and which is selectively coupled with the second input shaft via a second gear selection device; and an air conditioning compressor;

the control unit including:

a first map in which an EV driving permitting region is set according to an SOC of the battery device and a second map in which the EV driving permitting region of the first map is narrowed, wherein a driving control is performed by selecting the second map to be referred to in place of the first map when an EV driving is shifted to an internal combustion engine driving as a result of the SOC entering from the EV driving permitting region to an EV driving prohibiting region while the air conditioning compressor is in operation, and wherein the driving control is performed by selecting the first map to be referred to in place of the second map when the internal combustion engine driving is shifted to the EV driving as a result of the SOC entering again the EV driving permitting region from the EV driving prohibiting region.

2. A control unit for a vehicle driving system, the vehicle driving system including:

an internal combustion engine;

an electric motor;

a battery device which supplies electric power to the electric motor;

a transmission mechanism including a first input shaft which is connected to the electric motor and which is selectively connected to the internal combustion engine via a first engaging and disengaging unit, a second input shaft which is selectively connected to the internal combustion engine via a second engaging and disengaging unit, and an output shaft which is selectively coupled with the first input shaft via a first gear selection device and which is selectively coupled with the second input shaft via a second gear selection device; and an air conditioning compressor, the control unit including:

a first map in which an EV driving permitting region is set according to an SOC of the battery device and a second map in which the EV driving permitting region of the first map is narrowed, wherein a driving control is performed by selecting the second map to be referred to in place of the first map when the air conditioning compressor is actuated, and wherein, when the battery device starts to deteriorate, a falling rate of a threshold of a lower limit zone where the internal combustion engine can still be started by the electric motor is set to be smaller than those of thresholds of other zones to thereby ensure the lower limit zone so that the internal combustion engine can be started by the electric motor.

3. The control unit of claim 2, wherein, when the EV driving is shifted to the internal combustion engine driving, a gear selection map is changed to a charge preference mode.

4. The control unit of claim 2, wherein, the air conditioning compressor is an electric air conditioning compressor which is driven by being supplied with electric power from the battery device.

5. The control unit of claim 2, wherein the air conditioning compressor is coupled to the first input shaft via an air conditioning clutch.

6. A control unit for a vehicle driving system, the vehicle driving system including:

an internal combustion engine;

an electric motor;

a battery device which supplies electric power to the electric motor;

a transmission mechanism including a first input shaft which is connected to the electric motor and which is selectively connected to the internal combustion engine via a first engaging and disengaging unit, a second input shaft which is selectively connected to the internal combustion engine via a second engaging and disengaging unit, and an output shaft which is selectively coupled with the first input shaft via a first gear selection device and which is selectively coupled with the second input shaft via a second gear selection device; and an air conditioning compressor, the control unit including:

a first map in which an EV driving permitting region is set according to an SOC of the battery device and a second map in which the EV driving permitting region of the first map is narrowed, wherein a driving control is performed by selecting the second map to be referred to in place of the first map when the air conditioning compressor is actuated, wherein the air conditioning compressor is coupled to the first input shaft via an air conditioning clutch, and wherein, when a cooling performance of the air conditioning compressor is higher than a required cooling performance and an off state period in a PWM control is equal to or larger than a predetermined number of times while the driving control is being performed based on the second map, the first map is selected back from the second map.

7. A control unit for a vehicle driving system, the vehicle driving system including:

an internal combustion engine;

an electric motor;

a battery device which supplies electric power to the electric motor;

a transmission mechanism including a first input shaft which is connected to the electric motor and which is selectively connected to the internal combustion engine via a first engaging and disengaging unit, a second input shaft which is selectively connected to the internal combustion engine via a second engaging and disengaging unit, and an output shaft which is selectively coupled with the first input shaft via a first gear selection device and which is selectively coupled with the second input shaft via a second gear selection device; and an air conditioning compressor, the control unit including:

a first map in which an EV driving permitting region is set according to an SOC of the battery device and a second map in which the EV driving permitting region of the first map is narrowed, wherein a driving control is performed by selecting the second map to be referred to in place of the first map when the air conditioning compressor is actuated, wherein the air conditioning compressor is coupled to the first input shaft via an air conditioning clutch, and wherein, when a cooling performance of the air conditioning compressor is lower a predetermined deviation or more than a required cooling performance, a gear shift is performed to increase a rotation speed of the first input shaft so as to satisfy the required cooling performance or the first gear selection device is shifted without changing the gear engaged with which the vehicle is driven.

8. The control unit of claim 1, wherein, when the battery device starts to deteriorate, a falling rate of a threshold of a lower limit zone where the internal combustion engine can still be started by the electric motor is set to be smaller than those of thresholds of other zones to thereby ensure the lower limit zone so that the internal combustion engine can be started by the electric motor.

9. The control unit of claim 1, wherein, when the EV driving is shifted to the internal combustion engine driving, a gear selection map is changed to a charge preference mode.

10. The control unit of claim 1, wherein, the air conditioning compressor is an electric air conditioning compressor which is driven by being supplied with electric power from the battery device.

11. The control unit of claim 1, wherein the air conditioning compressor is coupled to the first input shaft via an air conditioning clutch.

12. The control unit of claim 11, wherein, when a cooling performance of the air conditioning compressor is higher than a required cooling performance and an off state period in a PWM control is equal to or larger than a predetermined number of times while the driving control is being performed based on the second map, the first map is selected back from the second map.

13. The control unit of claim 11, wherein, when the cooling performance of the air conditioning compressor is lower a predetermined deviation or more than the required cooling performance, a gear shift is performed to increase a rotation speed of the first input shaft so as to satisfy the required cooling performance or the first gear selection device is shifted without changing the gear engaged with which the vehicle is driven.

* * * * *